United States Patent
Hiramoto et al.

[11] Patent Number: 5,849,400
[45] Date of Patent: Dec. 15, 1998

[54] MAGNETIC THIN FILM, AND METHOD OF MANUFACTURING THE SAME, AND MAGNETIC HEAD

[75] Inventors: Masayoshi Hiramoto, Ikoma; Osamu Inoue, Moriguchi; Koichi Kugimiya, Toyonaka; Kenji Iijima, Kyoto, all of Japan

[73] Assignee: Matsushita Electric Industrial Co., Ltd., Osaka, Japan

[21] Appl. No.: 594,323

[22] Filed: Jan. 30, 1996

Related U.S. Application Data

[62] Division of Ser. No. 439,574, May 11, 1995, Pat. No. 5,589,221.

[30] Foreign Application Priority Data

| May 30, 1994 | [JP] | Japan | 6-116454 |
| May 16, 1994 | [JP] | Japan | 6-100939 |
| Dec. 7, 1994 | [JP] | Japan | 6-303614 |

[51] Int. Cl.⁶ .................................................. B32B 15/00
[52] U.S. Cl. .................. 428/213; 428/216; 428/457; 428/693; 428/698; 428/900; 428/692; 148/300; 148/306
[58] Field of Search ..................... 428/213, 216, 428/457, 693, 698, 900, 692; 148/300, 306

[56] References Cited

U.S. PATENT DOCUMENTS

| 5,034,273 | 7/1991 | Sakakima et al. | 428/336 |
| 5,117,321 | 5/1992 | Nakanishi et al. | 360/120 |
| 5,290,629 | 3/1994 | Kobayashi et al. | 428/332 |
| 5,432,645 | 7/1995 | Terunuma | 360/126 |
| 5,452,167 | 9/1995 | Nago | 360/126 |

FOREIGN PATENT DOCUMENTS

| 0442760 | 8/1991 | European Pat. Off. |
| 59-9905 | 1/1984 | Japan |
| 61-233409 | 10/1985 | Japan |
| 62-154212 | 7/1987 | Japan |
| 62-210607 | 9/1987 | Japan |
| 63-57758 | 3/1988 | Japan |
| 1-238106 | 9/1989 | Japan |
| 2-288209 | 11/1990 | Japan |
| 3-124005 | 5/1991 | Japan |
| 4-285153 | 10/1992 | Japan |

OTHER PUBLICATIONS

Herzer, G., "Grain Size Dependence of Coercivity and Permeability in Nanocrystalline Ferromagnets," IEEE Transactions on Magnetics, vol. 26, No. 5, Sep. 1990, pp. 1397–1402.

Senda, M. et al., "Magnetic Properties of Ion–Beam–Sputtered Fe/Co and Fe/CoFe Multilayer Films," Appl. Phys. Lett., vol. 52, No. 8, Feb. 22, 1988, pp. 672–673.

(List continued on next page.)

*Primary Examiner*—Stevan A. Resan
*Attorney, Agent, or Firm*—Morrison & Foerster LLP

[57] ABSTRACT

A magnetic thin film having excellent soft magnetic properties formed by alternately laminating a main magnetic layer and an intermediate layer, in which the main magnetic layer includes magnetic crystal grains substantially having a columnar structure which have an average height dl and an average diameter ds forming a shape ratio of $0.3 \leq ds/dl \leq 90.9$, and the intermediate layer has saturation magnetic flux density of at least 0.1 tesla less than the main magnetic layer. The main magnetic layer and the intermediate layer having saturation magnetic flux density of at least 0.1 tesla less than the main magnetic layer are alternately laminated. It is preferable that the main magnetic layer has a thickness of 3 to 100 nm, and the intermediate layer has a thickness of 0.1 to 10 nm. In addition, it is preferable that a thickness of the entire laminated structure is in the range of about 100 nm to 10 μm. The main magnetic layer is formed mainly of magnetic crystal grains, and there are some grains which grow penetrating the intermediate layer.

44 Claims, 6 Drawing Sheets

OTHER PUBLICATIONS

Slonczewski, J.C., "Structure of Domain Walls in Multiple Films," Physics of Films, U.F. Gianola, Chairman, Journal of Applied Physics, vol. 37, No. 3, Mar. 1, 1966, pp. 1268–1269.

"Method of Preparing Multilayer Magnetic Films," IBM Technical Disclosure Bulletin, vol. 33, No. 3A, Aug. 1990, pp. 121–122.

H. Ono et al., "Thermal Stability of Fe–Zr/Fe–Zr–N Soft Magnetic Multilayered Films," IEEE Translation Journal on Magnetics in Japan, vol. 7, No. 11, Nov. 1992, New York, pp. 907–911.

MAGNETIC THIN FILM, AND METHOD OF MANUFACTURING THE SAME, AND MAGNETIC HEAD

This application is a divisional of U.S. application Ser. No. 08/439,574, filed May 11, 1995, now U.S. Pat. No. 5,589,221.

FIELD OF THE INVENTION

This invention relates to a magnetic thin film which is applied to magnetic circuit components such as a magnetic head.

BACKGROUND OF THE INVENTION

A magnetic thin film having excellent soft magnetic properties at several tens of MHz is desired for use with a magnetic head for high-density television (HDTV) which requires a high transmission rate or for other magnetic circuit components which are becoming more and more miniaturized. It is known that soft magnetic properties of metallic magnetic materials with high saturation magnetic flux density are greatly influenced by magnetocrystalline anisotropic energy, a magnetostriction constant, or a magnetic domain structure of the metallic magnetic materials. As a means to improve soft magnetic properties of metallic magnetic materials, it was proposed to reduce coercivity of a multilayer film comprising permalloy and non-magnetic materials being laminated to about one tenth of a monolayer (Nature, Vol. 194, pp. 1035, 1962). This method, which is theoretically explained by J. C. Slonczewski et al. (J. Appl. Phys., Vol. 37, pp. 1268, 1965), is known as the magnetostatic bonding effect because magnetostatic bonding is enhanced between magnetic layers sandwiched with non-magnetic layers through layers being laminated, and also because domain wall energy is reduced through controlling magnetic flux from leaking.

Recently, a magnetic thin film having improved soft magnetic properties was attained by dispersing metal magnetic crystal grains which are smaller than an exchange bonding length inside a thin film such that the orientation becomes random, and also by reducing apparent magnetocrystalline anisotropic energy through crystal grains being placed so close to each other that exchange bonding can take place between the magnetic metal crystal grains (IEEE Trans. Magn., Vol. 26, pp. 1397, 1990 etc.).

As a means to attain the above-mentioned nanocrystalline soft magnetic thin films, a method is known, in which magnetic crystal grains of several nanometer are deposited by conducting heat treatment to a metal magnetic thin film which contains a non-magnetic element and is in an amorphous condition (MAG-23,27,2746,1987). Another means, known as a manocrystalline effect, is a method of controlling manostructure by laminating a non-magnetic layer and a magnetic layer with the periodicity of several nanometers (Appl. Phys. Lett., 52,672,1988).

The above-mentioned theory of J. C. Slonczewski was applied in the past to improve soft magnetic properties by enhancing magnetostatic bonding through lamination of a material with high saturation magnetic flux density of more than 1.2 tesla. However, even if a non-magnetic layer is extremely thinned to about 1 nm, coercivity can be reduced only to about half of a single film. This is due to the fact that materials with high saturation magnetic flux density generally possess high magnetocrystalline anisotropy. Also, when a laminated film having this kind of non-magnetic layer of about 1 nm as this one is formed, for example, since interface free energy at the interface of non-magnetic layer/metal magnetic layer, such as $SiO_2$/Fe, is substantially large, a clear layer structure can not be obtained. Furthermore, if, for example, this is an interface of metal non-magnetic layer/metal magnetic layer such as Cu/Fe, when a heat treatment is conducted to this soft magnetic laminated thin film a t the time of industrial application, the layer structure is destroyed even further due to layer-to-layer dispersion, and magnetic layers are bonded to each other directly. Thus, exchange bonding works between the magnetic layers, and magnetostatic bonding is no longer dominant, so that the problem arose that soft magnetic properties can not be improved as expected through a structural change in magnetic domain.

Conventionally, for a nanocrystalline magnetic thin film to be formed to minute crystal grains of less than exchange bonding length, when this thin film is applied to a type of depositing minute crystal grains from an amorphous condition, saturation magnetic flux density is small at low temperature still with the amorphous condition. Furthermore, when the temperature of heat treatment is too high, heat stabilization of the soft magnetic properties is bad because the grains grow larger than the grain size for the exchange bonding length, so that the specific temperature of heat treatment is generally restricted to about 500° C.

Due to this, for example, when a magnetic thin film was applied to a magnetic head, it was not possible to use highly reliable glass having a high melting point in the process of heat treatment due to glass fusion of the head. As a result, the problem arose that the yield of head production and reliability of the head itself could not be improved. In addition, since the temperature of heat treatment was restricted, different properties were attained by differences in the temperature of the heat treatment.

Furthermore, when a nanocrystalline magnetic thin film comprising a non-magnetic layer and a magnetic layer, which were laminated with the periodicity of several nanometer orders is used, growth of grains can be controlled by thickening the non-magnetic layer, so that it is possible to improve stability of heat treatment, but saturation magnetic flux density becomes low because the ratio of the non-magnetic materials occupying the entire magnetic body becomes higher. Moreover, the non-magnetic layer, which is present between the magnetic layers, deteriorates the exchange bonding in the direction perpendicular to the film surface. In addition, the magnetic layer which grows on the surface of a non-magnetic layer by means of vapor deposition tends to grow oriented to a specific crystal surface, so that magnetic crystal grains which are adjacent to each other in the direction perpendicular to the film surface via a non-magnetic layer no longer have crystal surfaces at random to each other. Therefore, the problem with this was that the apparent magnetocrystalline anisotropy was not sufficiently lowered,. and the soft magnetic properties were not improved.

Furthermore, when a magnetic thin film is used which combines the above-mentioned magnetostatic bonding effect and the manocrystalline effect, namely, when a magentic thin film is used which is formed by laminating a non-magnetic layer having sufficient thickness for attaining magnetostatic bonding in the direction perpendicular to the film surface and a magnetic layer having crystal grains with an average diameter of several nanometers inside the film surface such as when the magnetic layer itself was thinned to several nanometers for miniaturizing the diameter of crystal grain inside the film surface, the problem arose that the apparent saturation magnetic flux density became smaller. When this aspect was compensated by using a material having high saturation magnetic flux density such as ferrite, the problem with this was that protection against corrosion sufficient for practical use could not be attained.

In addition, in view of industrial productivity, the speed of film formation needed to be controlled in order to produce a magnetic thin film with high yield comprising extremely thin films of several nanometers to several tens of nanometers which were laminated, and thus using conventional techniques, the production efficiency could not be improved.

SUMMARY OF THE INVENTION

It is an object of this invention to solve the various problems mentioned above in the conventional magnetic thin film having high saturation magnetic flux density by providing a mangetic thin film which has excellent corrosion resistance, heat treatment stability, and soft magnetic properties even with high saturation magnetic flux denstiy of more than 1.3 tesla by means of controlling the composition and manostructure of the magnetic thin film. Another object of this invention is to provide a method of manufacuturing the magnetic thin film easily.

In order to accomplish these and other objects and advantages, a magnetic thin film of this invention comprises a main magnetic layer and an intermediate layer being alternately laminated, wherein the main magnetic layer is comprised of magnetic crystal grains substantially, having a columnar structure, the magnetic crystal grains have an average height dl and an average diameter ds forming a shape ratio of $0.3 \leq ds/dl \leq 0.9$, and wherein the intermediate layer has a saturation magnetic flux density of at least 0.1 tesla less than the main magnetic layer. The main magnetic film can be defined as a magnetic layer part which has 50% or more saturation magnetic flux density of the entire magnetic thin film. The magnetic crystal grains substantially having a columnar structure indicates that 50% or more magnetic crystal grains having a columnar or spherical structure are present in the main magnetic layer. The average height and the average diameter were measured by combining a width at half maximum in XRD (X-ray defract pattern) and observations conducted by the SEM and the TEM.

It is preferable that the magnetic thin film has an average diameter ds in the range of $1 \leq ds \leq 40$ nm.

A second embodiment of this invention comprises a magnetic thin film comprised of crystal grains in a metal magnetic alloy, wherein at least one element is contained inside said grains which is selected from the group consisting of a non-magnetic element, an element having a lower oxide formation free energy than Fe, and an element having lower nitride formation free energy than Fe, and wherein the element has a composition gradient with a higher concentration towards the surface of the grains than inside the grains.

It is preferable that the magnetic thin film comprises a main magnetic layer and an intermediate layer being alternately laminated, wherein the main magnetic layer comprises a magnetic thin film having a composition gradient, and the intermediate layer has a saturation magnetic flux density of at least 0.1 tesla less than the main magnetic layer.

Furthermore, it is preferable that the composition gradient is greater in the thickness direction of the film than in the surface direction.

In addition, it is preferable that at least one material having lower oxide formation free energy or lower nitride formation free energy than Fe is present inside the main magnetic layer.

Also, it is preferable that the material having lower oxide formation free energy or lower nitride formation free energy than Fe present inside the main magnetic layer is at least one element selected from the group consisting of Al, Si, Ti, Cr, and V.

It is preferable that at least one element selected from the group consisting of C, B, O, and N is present inside the main magnetic layer.

Furthermore, it is preferable that the magnetic thin film comprises a main magnetic layer having an average thickness dA of $3 \leq dA \leq 100$ nm and an intermediate layer having an average thickness dB of $0.1 \leq dB \leq 10$ nm, and it is $0 \leq dB/dA \leq 0.5$.

In addition, it is preferable that the intermediate layer includes at least one element having lower oxide formation free energy or lower nitride formation free energy than Fe and at least one element selected from the group consisting of C, B, O, and N.

Also, it is preferable that the intermediate layer comprises at least one material, which is a nitride, an oxide, or a carbide of an element selected from the group consisting of Fe, Al, Si, Ta, Ti, Mg, Zr, Mn, Ca, Cr, B, V, Nb, W, Zn, C, Mo, Ce, Hf.

It is preferable that the intermediate layer comprises a metal magnetic element. Examples of this metal magnetic element are Fe, Co, and Ni.

Furthermore, it is preferable that the intermediate layer comprises multiple layers and the intermediate layer has a multiple structure formed by alternately laminating at least one layer of a magnetic layer A having an average thickness of less than 5 nm and one layer of a separation layer B having an average thickness of less than 5 nm, and an average thickness DM of the main magnetic layer is greater than an average thickness DI of the multiple intermediate layer.

In addition, it is preferable that the average thickness DM of the main magnetic layer is more than 3 nm and less than 100 nm, and the average thickness DI of the multiple intermediate layer is more than 0.2 nm and less than 15 nm, and the multiple intermediate layer comprises a separation layer B having an average thickness of less than 5 nm and a magnetic layer A having an average thickness of less than 5 nm.

Also, it is preferable that at least one material having lower oxide formation free energy or lower nitride formation free energy than Fe is present inside the magnetic layer A.

It is preferable that at least one element selected from the group consisting of C, B, O, and N is present inside the magnetic layer A.

Furthermore, it is preferable that at least one material having lower oxide formation free energy or lower nitride formation free energy than Fe and more than one element selected from the group consisting of C, B, O, and N are present inside the separation layer B.

In addition, it is preferable that a metal magnetic element is present inside the separation layer B.

Also, it is preferable that the intermediate layer comprises a magnetic layer substantially comprising spherical or oval magnetic crystal grains. In other words, 50% or more magnetic crystal grains having a columnar or spherical structure are present in the main magnetic layer.

It is preferable that the main magnetic layer has an average thickness of 3 to 15 nm, and the intermediate layer has an average thickness of 3 to 15 nm. The average thickness was measured by mainly controlling a film formation time when a magnetic thin film was formed, and a plurality of methods were used in combination for the measurement, that is, direct observations by TEM and SEM, and further for a substance of 5 nm or smaller, superlattice diffraction lines observed by XRD as well.

Furthermore, it is preferable that at least one element $M_B$ having lower oxide formation free energy or lower nitride formation free energy than Fe and at least one element $X_B$ selected from the group consisting of C, B, O, and N are present inside the intermediate layer, and when an element $M_A$ having lower oxide formation free energy or lower nitride formation free energy than Fe is present inside the main magnetic layer, an element which satisfies the relationship of $G(M_A, X_B) \geq G(M_B, X_B)$ is also present, wherein $G(M_A, X_B)$ represents compound formation free energy of the element $M_A$ and the element $X_B$ and $G(M_B, X_B)$ represents compound formation free energy of the element $M_B$ and the element $X_B$.

In addition, it is preferable that at least one element $M_B$ having lower oxide formation free energy or lower nitride formation free energy than Fe and at least one element $X_B$ selected from the group consisting of C, B, O, and N are present inside the intermediate layer, and when at least one element $M_A$ having lower oxide formation free energy or lower nitride formation free energy than Fe and at least one element X selected from the group consisting of C, B, O, and N are present inside the main magnetic layer, an element which satisfies the relationship of $G(M_A, X_A) \geq G(M_B, X_B)$ is also present, wherein $G(M_A, X_A)$ represents compound formation free energy of the element $M_A$ and the element $X_A$ and $G(M_B, X_B)$ represents compound formation free energy of the element $M_B$ and the element $X_B$.

Also, it is preferable that an element which satisfies the relationships of $G(M_B, X_A) \geq G(M_B, X_A)$ and $G(M_A, X_B) \geq G(M_B, X_B)$ is present, wherein $G(M_B, X_A)$ represents compound formation free energy of the element $M_B$ and the element $X_A$ and $G(M_A, X_B)$ represents compound formation free energy of the element $M_A$ and the element $X_B$.

It is preferable that the main magnetic layer and the intermediate layer share at least one element, and this shared element has an almost successive composition gradient between the main magnetic layer and the intermediate layer.

Furthermore, it is preferable that the main magnetic layer and the intermediate layer share at least one element, and an atomic weight % of concentration a of the element inside the main magnetic layer and an atomic weight % of concentration b of the element inside the intermediate layer, at an interface of the main magnetic layer and the intermediate layer are in the range of $0<a/b \leq 5.0$.

A third embodiment of this invention is a method of manufacturing a magnetic thin film. The method of manufacturing a magnetic thin film comprises the steps of: alternately forming at least one layer of a main magnetic precursor layer containing at least one element having a lower oxide or nitride formation free energy than Fe and at least one element selected from the group consisting of Fe, Co, and Ni and at least one layer of an intermediate precursor layer on the surface of a substrate; conducting a heat treatment thereto; and alternately laminating a main magnetic layer comprising magnetic crystal grains substantially having a columnar structure which have an average height dl and an average diameter ds forming a shape ratio of $0.3 \leq ds/dl \leq 0.9$ and an intermediate layer having a saturation magnetic flux density of at least 0.1 tesla less than the main magnetic layer. Here, a precursor refers to a material in a state before the heat treatment. The substrate comprises a non-magnetic substrate, and in particular, a non-magnetic substrate with a thermal expansion coefficient of about 50 to $180 \times 10^{-7}/°$ C., or a ferrite substrate.

It is preferable that the method of manufacturing the magnetic thin film further comprises the step of adding at least one element selected from the group consisting of oxygen, nitrogen, boron, and carbon as a dopant when forming the main magnetic precursor layer, and at least one element is present inside crystal grains of a metal magnetic alloy which is selected from the group consisting of a non-magnetic element, an element having lower oxide formation free energy than Fe, and an element having lower nitride formation free energy than Fe, wherein the element has a composition gradient with higher concentration towards the surface than inside the grains.

Furthermore, it is preferable that more than one element having higher oxide or nitride formation free energy is present in the intermediate precursor layer being compared with at least one element having lower oxide or nitride formation free energy than Fe which is contained in the main magnetic precursor layer.

In addition, it is preferable that the intermediate precursor layer comprises a layer with a parent phase of amorphous magnetic crystal grains or magnetic crystal grains of less than 2 nm, and an intermediate layer having a multiple structure is formed by forming a magnetic layer A and a separation layer B through heat treatment. The parent phase refers to a composition which is present at 50% or more in a layer or a film (in this case, intermediate precursor layer).

Also, it is preferable that the main magnetic precursor layer and the intermediate precursor layer are formed respectively by means of a vapor deposition method using the same vapour deposition source, and the intermediate precursor layer is deposited in a gas atmosphere containing oxygen or nitrogen.

It is preferable that the dopant is added in an amount of 1 ppm to 10 atm %.

Furthermore, it is preferable that the heat treatment is conducted at a temperature of 400° to 700° C., and the processing time ranges from 0.5 to 5 hours.

A fourth embodiment of this invention is a magnetic head which uses the above-mentioned magnetic thin film for a magnetic part of the magnetic head.

According to the above-mentioned configuration of this invention, when a magnetic thin film comprises a main magnetic layer and an intermediate layer being alternately laminated, wherein the main magnetic layer is comprised of magnetic crystal grains substantially having a columnar structure which have an average height dl and an average diameter ds forming a shape ratio of $0.3 \leq ds/dl \leq 90.9$, and wherein the intermediate layer has saturation magnetic flux density of at least 0.1 tesla less than the main magnetic layer, the magnetic thin film can attain excellent soft magnetic properties. This is mainly due to the fact that when the main magnetic layer comprised of magnetic crystal grains having this shape ratio is used, the distribution ratio of magnetic bonding inside the film surface and magnetic bonding in the vertical direction to the film can be optimized, so that the magnetic energy in the entire film can be reduced. In particular, when ds is in the range of $1 \leq ds \leq 40$ nm, excellent soft magnetic properties can be attained.

The magnetic thin film of this invention is comprised of crystal grains of a metal magnetic alloy, wherein at least one element is contained inside the grains which is selected from the group consisting of a non-magnetic element, an element having lower oxide formation free energy than Fe, and an element having lower nitride formation free energy than Fe, and wherein this element has a composition gradient with higher concentration towards the surface than inside the grain, or alternatively, this magnetic thin film is used as a main magnetic layer, and an intermediate layer having saturation magnetic flux density of at least 0.1 tesla less than the main magnetic layer is alternately laminated to form a magnetic thin film which can attain excellent soft magnetic properties. This is mainly due to the fact that by providing a composition gradient inside the grain of the crystal grains in the main magnetic layer, the crystal grains can be prevented from growing, so that they possess excellent soft magnetic properties even at the time of heat treatment with high temperature. In particuar, when the composition gradient inside the grain is greater in the vertical direction of the film than in the in-plane direction, heat stability of the layer structure itself can be enhanced. In addition, magnetic bonding between in-plane magnetic grains can be strengthened, so that soft magnetic properties with excellent heat stability can be attained.

Also, when at least one material having a lower oxide formation free energy or lower nitride formation free energy than Fe is contained inside the main magnetic layer of the magnetic thin film of this invention, grain interface dispersion can be appropriately prevented in a grain interface part of magnetic crystal grains. Moreover, magnetic crystal grains having a specific shape ratio of this invention can be attained easily, and a structure with a composition gradient inside the magnetic crystal grain of this invention can be easily attained. In particular, it is preferable that the material having a lower oxide formation free energy or lower nitride formation free energy than Fe is at least one element selected from the group consisting of Al, Si, Ti, Cr, and V. Furthermore, when at least one element selected from the group consisting of C, B, O, and N is present inside the main magnetic layer, a shape ratio of magnetic crystal grains forming the main magnetic layer as well as a manostructure with a composition gradient inside the grain can be attained easily, thereby improving heat treatment stability.

According to the magnetic thin film of this invention, soft magnetic properties with high saturation magnetic flux density can be attained when the magnetic thin film comprises a main magnetic layer having an average thickness dA of $3 \leq dA \leq 100$ nm and an intermediate layer having an average thickness dB of $0.1 \leq dB \leq 10$ nm, and when it is also $0 < dB/dA \leq 0.5$. When the intermediate layer includes at least one element having lower oxide formation free energy or lower nitride formation free energy than Fe and at least one element selected from the group consisting of C, B, O, and N, structural stability of the main magnetic layer can be enhanced, so that heat stability of soft magnetic properties can be improved even more. Also, by including a metal magnetic element in the intermediate layer, the interface free energy at the metal magnetic layer/intermediate layer is reduced, and the intermediate layer can be made thinner. In this way, magnetic bonding between magnetic layers or between magnetic crystal grains can be improved, and excellent soft magnetic properites can be attained.

It is preferable that the intermediate layer in the magnetic thin film of this invention comprises a multiple intermediate layer which has a multiple structure being formed by alternately laminating at least one layer of a magnetic layer A and one layer of a separation layer B both having an average thickness of less than 5 nm, and an average thickness DM of the main magnetic layer greater than an average thickness DI of the multiple intermediate layer. Accordingly, magnetic properties possessed by the magnetic layer B inside the multiple intermediate layer, magnetostatic bonding between the magnetic layers can be strengthened more than by separating the magnetic layer only with a non-magnetic layer, so that excellent soft magnetic properties can be attained. In addition, since the separation between the magnetic layers can be conducted excellently with a little amount of non-magnetic materials, saturation magnetic flux density of the entire film can be prevented from being reducing.

In particular, when the average thickness DM of the main magnetic layer is more than 3 nm and less than 100 nm, and the average thickness DI of the multiple intermediate layer is more than 0.2 nm and less than 15 nm, and the multiple intermediate layer comprises a separation layer B having an average thickness of less than 5 nm and a magnetic layer A having an average thickness of less than 5 nm, excellent soft magnetic properties can be obtained. Especially when at least one material having lower oxide formation free energy or lower nitride formation free energy than Fe is present inside the magnetic layer A, the manostructure of magnetic crystal grains inside the magnetic layer A can be attained easily, and when at least one element selected from the group consisting of C, B, O, and N is present in the magnetic layer A, heat stability of the manostructure of magnetic crystal grains inside the magnetic layer A can be improved. Furthermore, by including at least one element having lower oxide formation free energy or lower nitride formation free energy than Fe and more than one element selected from the group consisting of C, B, O, and N inside the separation layer B, a dispersion reaction between the multiple intermediate layer and the main magnetic layer can be controlled, and when a metal magnetic element is contained inside the separation layer B, the structure of the separation layer becomes clear by heat treatment, so that heat treatment stability of soft magnetic properties in the magnetic thin film of this invention can be improved even more.

When the intermediate layer in the magnetic thin film of this invention comprises a magnetic layer substantially comprised of spherical or oval magnetic crystal grains, it is easier to control the random property of the crystal orientation surface among metal magnetic crystal grains mainly comprising the main magnetic layer, so that the uniformity of magnetic properties in the film can be enhanced. It is also easier to control the coefficient of thermal expansion and magnetostriction constant which result from the structure. In particular, excellent soft magnetic properties can be attained when the intermediate layer substantially comprised of spherical or oval magnetic crystal grains has an average thickness of 3 to 15 nm, and the main magnetic layer has an average thickness of 3 to 15 nm. It is preferable that at least one material, having a lower oxide formation free energy or lower nitride formation free energy than Fe is contained in the intermediate layer, because heat stability of the preferable configuration in this invention can be enhanced. Furthermore, when at least one element selected from the group consisting of C, B, O, and N is present in the intermediate layer, the preferable configuration of the intermediate layer in this invention can be formed easily.

According to the magnetic thin film of this invention, it is preferable that at least one element $M_B$ having a lower oxide formation free energy or lower nitride formation free energy than Fe and at least one element $X_B$ selected from the group consisting of C, B, O, and N are present in the intermediate layer, and that an element $M_A$ having lower oxide formation free energy or lower nitride formation free energy than Fe is present inside the main magnetic layer, and that an element which satisfies the relationship of $$G(M_A, X_B) \geq G(M_B, X_B)$$

is also present, wherein $G(M_A, X_B)$ represents compound formation free energy of the element $M_A$ and the element $X_B$, and $G(M_B, X_B)$ represents compound formation free energy of the element $M_B$ and the element $X_B$. As a result, the reaction at the interface of magnetic layer/intermediate layer can be appropriately controlled, and therefore, the change of the structure, properties, and coefficient of thermal expansion etc. accompanied by the interface reaction can be controlled.

According to the magnetic thin film of this invention, it is preferable that at least one element $M_B$ having lower oxide formation free energy or lower nitride formation free energy than Fe and at least one element $X_B$ selected from the group consisting of C, B, O, and N are present inside the intermediate layer, and that at least one element $M_A$ having lower oxide formation free energy or lower nitride formation free energy than Fe and at least one element $X_A$ selected from the group consisting of C, B, O, and N are present inside the main magnetic layer, and that an element which satisfies the relationship of $$G(M_A, X_A) \geq G(M_B, X_B)$$

is also present, wherein $G(M_A, X_A)$ represents compound formation free energy of the element $M_A$ and the element $X_A$, and $G(M_B, X_B)$ represents compound formation free energy of the element $M_B$ and the element $X_B$, and that particularly an element which satisfies the relationships of $$G(M_B, X_A) \geq G(M_B, X_B)$$

$$G(M_A, X_B) \geq G(M_B, X_B)$$

is present, wherein $G(M_B, X_A)$ represents compound formation free energy of the element $M_B$ and the element $X_A$ and $G(M_A, X_B)$ represents compound formation free energy of the element $M_A$ and the element $X_B$. As a result, a dissociation reaction inside the main magnetic layer and reaction at the interface of magnetic layer/intermediate layer can be appropriately controlled, and therefore, the change of the structure, properties, and coefficient of thermal expansion etc. accompanied by the interface reaction can be controlled.

In one embodiment of the magnetic thin film of this invention, the main magnetic layer and the intermediate layer share at least one element, and this element has an almost successive composition gradient between the main magnetic layer and the intermediate layer, so that bonding between the laminated layers can become stronger, thereby improving the strength and the magnetic properties of the film. In particular, it is preferable that the main magnetic layer and the intermediate layer share at least one element, and an atomic weight % of concentration a of the element inside the main magnetic layer and an atomic weight % of concentration b of the element inside the intermediate layer at an interface of the main magnetic layer and the intermediate layer are in the range of $0 < a/b \leq 5.0$. Accordingly, interface stress etc. can be reduced, and stable layer structure and excellent soft magnetic properties can be attained.

When the magnetic thin film comprising the intermediate layer provided with more than one element having higher oxide or nitride formation free energy, compared with the main magnetic layer provided with at least one element, having lower oxide or nitride formation free energy than Fe, is subject to heat treatment, the composition gradient of magnetic crystal grains inside the main magnetic layer can be configured larger in the vertical direction.

The soft magnetic thin film of this invention having the multiple intermediate layer can solve the problems suffered by conventional films by forming a laminated film by alternately laminating a main magnetic layer M and an amorphous layer containing a magnetic metal, and then by depositing the magnetic layer A comprising the multiple intermediate layer from the amorphous layer and by forming the separation layer B. Thus, the film can be formed at high speed.

The magnetic laminated thin film of this invention has high saturation magnetic flux density of more than 1 tesla, and this magnetic laminated thin film also has high frequency characteristics of initial permeability with low coercivity. By forming this magnetic laminated thin film on the surface of a foundation and by using it as a magnetic head, high density signals can be recorded in a high coercivity medium. Furthermore, since the magnetic laminated thin film possesses excellent properties of heat resistance and wear resistance, the magnetic head does not deteriorate as much even over time. In addition, since the heat treatment can be conducted in a non-magnetic field atmosphere in the range of 400° C. to 800° C., a manufacturing process such as glass fusion for enhancing the strength can be performed as well.

Next, according to the method of manufacturing the magnetic thin film of this invention, the magnetic thin film of this invention can be produced efficiently.

Next, when the magnetic head of this invention applies one of the magnetic thin films mentioned above to a magnetic part of the magnetic head, glass with high melting point can be used, so that wear resistance and high reliability can be attained. Moreover, it is possible to accomplish improvement in high electromagnetic conversion efficiency and recording density.

DETAILED DESCRIPTION OF THE INVENTION

This invention will be described in detail by referring to the following illustrative examples and attached figures. The examples are not intended to limit the invention in any way.

Figure 1:
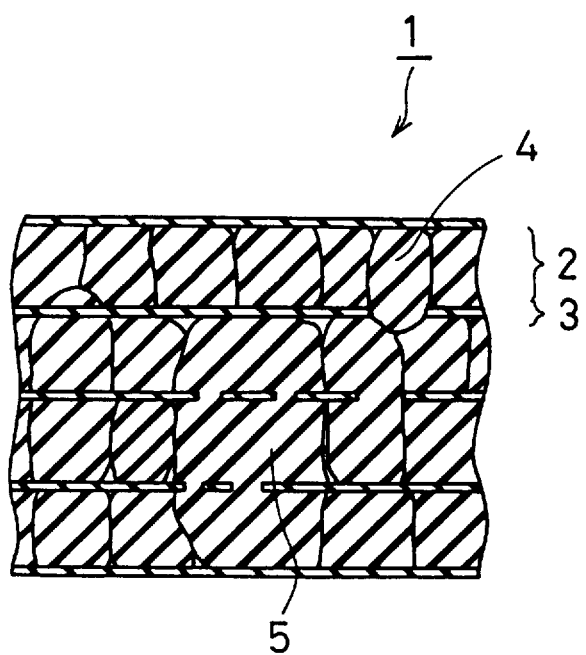
FIG. 1 is a cross-sectional view showing a magnetic thin film in one embodiment of this invention.

FIG. 1 is a cross-sectional view showing the concept of a magnetic thin film in one embodiment of this invention, in which a main magnetic layer 2 and an intermediate layer 3 having a saturation magnetic flux density of at least 0.1 tesla less than the main magnetic layer 2 are alternately laminated. It is preferable that the main magnetic layer 2 has a thickness of 3 to 100 nm, and that the intermediate layer 3 has a thickness of 0.1 to 10 nm. Furthermore, the thickness of the entire laminated structure is preferably in the range of about 100 nm to 10 μm. The main magnetic layer 2 is formed mainly of magnetic crystal grains 4, and there are some grains which grow such that they penetrate the intermediate layer 3. For example, a large magnetic crystal grain 5 penetrating several layers of the intermediate layer 3 may be also present. It is preferable that the saturation magnetic flux density in the intermediate layer 3 is smaller than the main magnetic layer by at least 0.1 tesla, and that the intermediate layer 3 may be comprised of a non-magnetic material. Furthermore, it is particularly preferable that the average diameter ds of the magnetic crystal grains is in the range of $1 \leq ds \leq 40$ nm.

Figure 2:
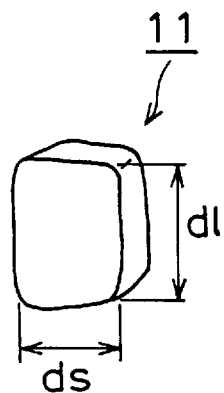
FIG. 2(a) and FIG. 2(b) are conceptional views showing a shape of a magnetic crystal grain in one embodiment of this invention.
Figure 2:
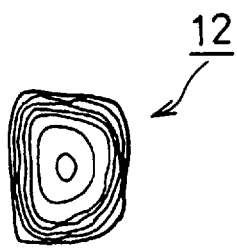

Next, FIG. 2(a) and FIG. 2(b) are conceptional views showing shapes of a magnetic crystal grain 11 in one embodiment of this invention. FIG. 2(a) shows that a magnetic crystal grain substantially having a columnar structure comprises a main magnetic layer, and the magnetic crystal grain has an average height dl and an average diameter ds with a shape ratio of $0.3 \leq ds/dl \leq 0.9$. FIG. 2(b) shows a magnetic crystal grain 12 having a composition gradient inside the grain, and lines inside the grain indicate composition lines.

Figure 3:
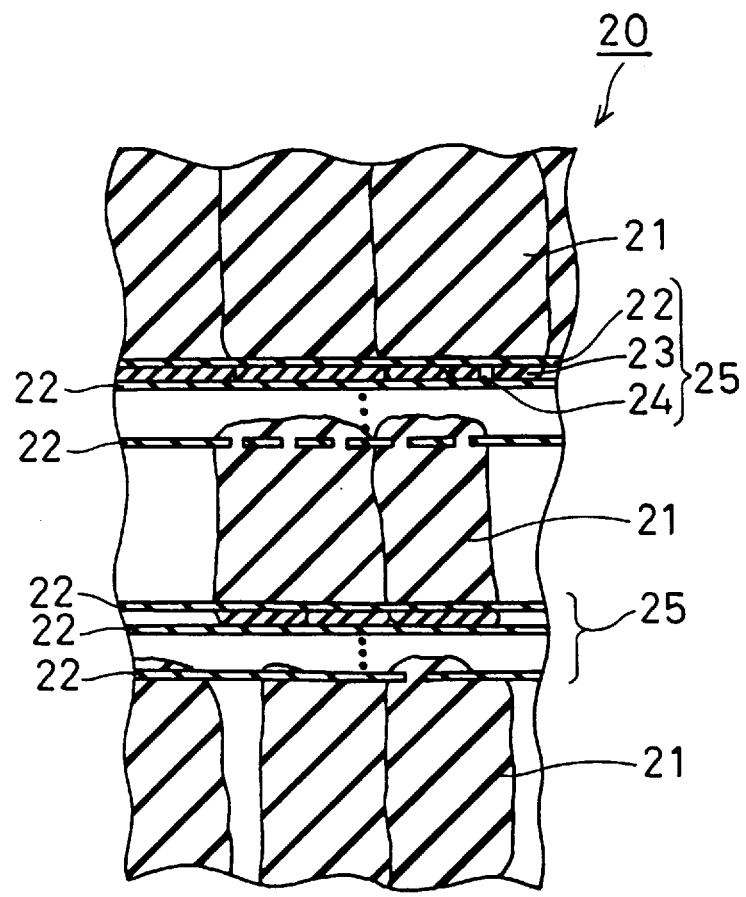
FIG. 3 is a cross-sectional view showing a magnetic thin film with a laminated structure which has multiple intermediate layers 25 in one embodiment of this invention.

FIG. 3 shows a magnetic thin film 20 with a laminated structure having a multiple layer intermediate layer 25 in one embodiment of this invention. This magnetic thin film 20 with the laminated structure comprises a main magnetic layer 21 and a multiple intermediate layer 25, and the multiple intermediate layer 25 comprises a separation layer B 22 and a magnetic layer A 23 disposed between the separation layers 22. A space part 24 may be present in the magnetic layer A 23. As for the magnetic thin film with the laminated structure having the multiple intermediate layer 25 shown in FIG. 3, it is preferable that the main magnetic layer 21 has a thickness of 3 to 100 nm, and that the intermediate layer 25 has a thickness of 0.2 to 15 nm. In addition, it is preferable that the separation layer B 22 has a thickness of 0.1 to 5 nm, and that the magnetic layer A 23 has a thickness of 0.1 to 5 nm. Also, when one layer of the separation layer B 22 and one layer of the magnetic layer A 23 form one pair, it is preferable to form 1 to 4 pairs of layers.

Figure 4:
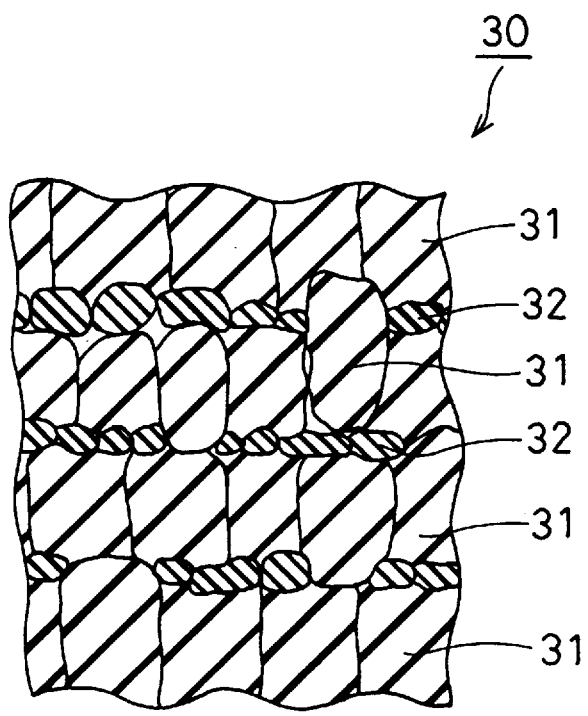
FIG. 4 is a cross-sectional view showing a magnetic thin film with a laminated structure in one embodiment of this invention.
Figure 5:
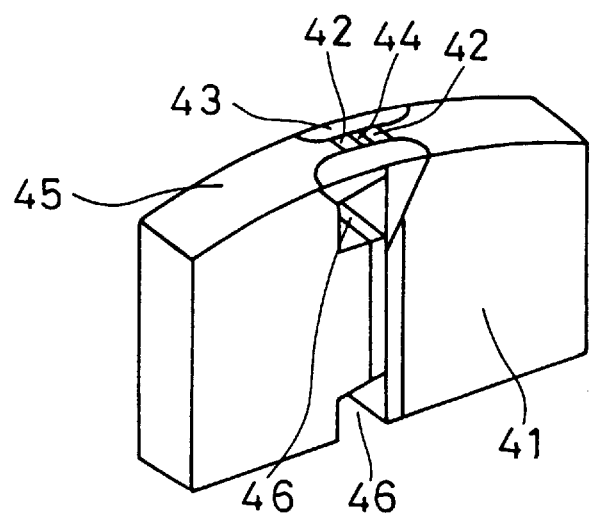
FIG. 5 is a perspective view of a MIG (metal in gap) type magnetic head to which a magnetic thin film of this invention can be applied.
Figures 6, 6A:
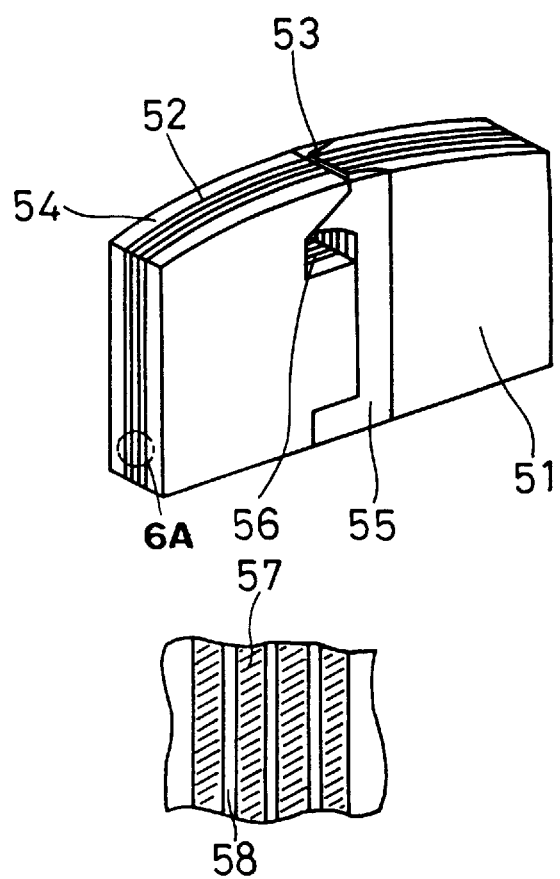
FIG. 6 is a perspective view of an alloy laminated film type magnetic head to which a magnetic thin film of this invention can be applied.

FIG. 4 shows a magnetic thin film 30 with a laminated structure in one embodiment of this invention. This magnetic thin film 30 with the laminated structure comprises a main magnetic layer 31 and an intermediate layer 32. The main magnetic layer 31 as well as the intermediate layer 32 are formed by the grains, and a space may be present in the intermediate layer 32.

As for the intermediate layer of the magnetic thin film in these embodiments, it is preferable that at least one element M having a lower oxide formation free energy or lower nitride formation free energy than Fe and at least one element selected from the group consisting of C, B, O, and N are included therein. In particular, it is preferable that these elements include more than one element, which is a nitride, an oxide, or a carbide of an element selected from the group consisting of Fe, Al, Si, Ta, Ti, Mg, Zr, Mn, Ca, Cr, B, V, Nb, W, Zn, C, Mo, Ce, Hf etc. It is also preferable that a metal magnetic element is contained inside the intermediate layer.

The intermediate layer in these embodiments of the magnetic thin film comprises a magnetic layer substantially composed of spherical or oval magnetic crystal grains, and it is particularly preferable that the main magnetic layer has an average thickness of 3 to 15 nm, and that the intermediate layer has an average thickness of 3 to 15 nm. In particular, it is preferable that at least one material M having a lower oxide formation free energy or lower nitride formation free energy than Fe is contained inside the intermediate layer, and furthermore, at least one element selected from the group consisting of C, B, O, and N is preferably present therein.

EXAMPLES

Compositions shown in the following examples were evaluated by combining the analyses of ICP (inductively coupled plasma) and EDS (energy dispersive type X-ray analysis) with the measurement of weight increase due to oxidation and nitriding. Furthermore, manostructures in the magnetic thin film and laminated magnetic thin film such as the form of crystal grain etc. were judged by the TEM or the SEM observations. In addition, an average diameter of crystal grain was determined by the TEM or the XRD (X-ray diffraction). Film thicknesses of the following magnetic layers and that of intermediate layers used here are values calculated respectively from the speed of forming a single film, or values obtained from the TEM and the SEM observations.

Compositions near an interface shown in the following tables are compositions obtained in average by the EDS which can limited the range to about 3 nm. In addition, amounts shown are in atomic weight percent unless otherwise indicated.

Example 1

The following examples were performed to examine magnetic properties of a magnetic thin film which is obtained by controlling the shape ratio between average height and average diameter of a magnetic crystal grain substantially having a columnar structure. Another object is to- examine types of intermediate layers in which this structure can be stably present.

By means of a magnetron sputtering method with the use of an Fe target, a magnetic thin film was formed by alternately laminating a magnetic layer of 10 nm, which was formed by changing substrate temperature in the range of 20° to 300° C. and discharge Ar-gas pressure in the range of 0.5 to 30 mTorr, and an intermediate layer of 2 nm, which was formed by using a $SiO_2$ target. Similarly, by means of a magnetron sputtering method with the use of a Fe target, a magnetic thin film of 3 μm thick was formed by alternately laminating a main magnetic layer of 40 nm, which was formed by changing substrate temperature in the range of 20° to 300° C. and discharge Ar-gas pressure in the range of 0.5 to 30 mTorr, and an intermediate layer of 2 nm which was formed by using a $SiO_2$ target. Here, the intermediate layer was formed by fixing substrate temperature and discharge gas pressure and by using $Ar+O_2$ as the discharge gas.

After the magnetic thin film being formed was subject to heat treatment at 350° C., the TEM observation was conducted. As a result, both of the magnetic thin films having main magnetic layers with thicknesses of 10 nm and 40 nm showed a columnar shape, and the height of the column was almost equal to the thickness of each magnetic layer. As the discharge gas pressure became higher, and the substrate temperature became lower, the average diameter of the column became thin. In addition, the average diameter of the column tended to be thinner as the magnetic layer became thinner. The shape ratio is defined as a value obtained by dividing the average diameter of the columnar magnetic crystal grain by the average height, and the shape ratios are shown in Table 1 together with the resistive magnetic power Hc of the magnetic thin films mentioned above.

TABLE 1

| Main magnetic layer 10 nm | Shape ratio | 0.2 | 0.3 | 0.4 | 0.7 | 1.0 | 1.2 |
|---|---|---|---|---|---|---|---|
| | Hc(Oe) | 2.1 | 9.6 | 0.6 | 0.7 | 0.9 | 2.5 |
| Main magnetic layer 40 nm | Shape ratio | 0.1 | 0.25 | 0.5 | 0.75 | 0.85 | 1.1 |
| | Hc(Oe) | 3.0 | 1.6 | 1.1 | 1.5 | 1.8 | 3.4 |

According to the results shown in Table 1, the magnetic crystal grains have a shape which looks like a columnar structure, and when the average height dl and average diameter ds of these columnar structures have a shape ratio which is in the range of 0.3≦ds/dl≦0.9, a magnetic body made of these magnetic crystal grains has excellent soft magnetic properties when this magnetic body is used as the main magnetic layer. This is attained because the distribution ratio between the magnetic bonding inside the film surface and the magnetic bonding in the vertical direction to the film are optimized under the above-mentioned conditions, and the local anisotropic dispersion is controlled by high orientation.

In these examples, Fe was used as the metallic magnetic material. However, it was confirmed that the same effects can be obtained with metal magnetic alloys mainly comprised of Co, Ni, Fe-Co, Co-Ni, Fe-Ni, Fe-Co-Ni and so on.

Example 2

The following examples were performed to examine a preferable range of an average diameter ds of a magnetic crystal grain substantially having a columnar structure.

By means of a magnetron sputtering method with the use of a Fe target, a magnetic thin film was formed by alternately laminating a magnetic layer, which was formed by changing substrate temperature in the range of 20° to 300° C. and discharge Ar-gas pressure in the range of 1 to 20 mTorr, and variously changing thickness of a main magnetic layer, and an intermediate layer of 1 nm composed of $Al_2O_3$, which was formed by using an Al target. Here, the intermediate layer was formed by fixing substrate temperature and discharge gas pressure and by using $Ar+O_2$ as the discharge gas. After the magnetic thin film being formed was subjected to a heat treatment at 350° C., the TEM observation was conducted. As a result, all the main magnetic layers were comprised of magnetic crystal columnar grains, and the height of the column was almost equal to the thickness of each main magnetic layer. The shape ratio is defined as a value obtained by dividing the average diameter of the columnar magnetic crystal grain by the average height, and the shape ratios are shown in Table 2 together with resistive magnetic power Hc of the magnetic thin films in these examples.

TABLE 2

| | Example | Comparative example | Example | Example | Comparative example | Comparative example | Comparative example |
|---|---|---|---|---|---|---|---|
| ds (nm) | 2 | 10 | 11 | 20 | 39 | 41 | 50 |
| dl (nm) | 7 | 7 | 20 | 40 | 40 | 60 | 60 |
| Shape ratio | 0.3 | 1.4 | 0.6 | 0.5 | 1.0 | 0.7 | 0.8 |
| Hc(Oe) | 0.9 | 1.7 | 0.8 | 1.1 | 1.8 | 2.1 | 3 |

Next, by means of a magnetron sputtering method with the use of a target comprising Co provided with an Fe chip on the top, a magnetic thin film was formed by alternately laminating a main magnetic layer composed of 3Fe-70Co, which was formed by changing substrate temperature in the range of 20° to 300° C. and discharge Ar-gas pressure in the range of 0.5 to 25 mTorr and variously changing thickness of the main magnetic layer, and an intermediate layer of 1 nm composed of $Al_2O_3$, which was formed by using an Al target. The intermediate layer was formed by fixing the substrate temperature and the discharge gas pressure, and by using $Ar+O_2$ as the discharge gas. After the magnetic thin film being formed was subject to heat treatment at 350° C., the TEM observation was conducted. As a result, all the main magnetic layers were comprised of magnetic crystal columnar grains, and the height of the column was almost equal to the thickness of each main magnetic layer. The shape ratio is defined as a value obtained by dividing the average diameter of the columnar magnetic crystal grain by the average height, and the shape ratios are shown in Table 3 together with resistive magnetic power Hc of the magnetic thin films mentioned above.

TABLE 3

| | Comparative example | Example | Example | Example | Comparative example | Comparative example | Comparative example |
|---|---|---|---|---|---|---|---|
| ds (nm) | 2 | 2 | 2 | 40 | 38 | 49 | 68 |
| dl (nm) | 2 | 3 | 10 | 60 | 40 | 100 | 60 |
| Shape | 1 | 0.7 | 0.2 | 0.7 | 1.0 | 0.5 | 1.1 |
| Hc(Oe) | 2 | 1.1 | 1.5 | 1.2 | 2.5 | 2.0 | 2 |

According to the results shown in Tables 2 and 3, a plurality of magnetic crystal grains have a columnar shape, and it is clear that the magnetic crystal grains show excellent soft magnetic properties when the average diameter ds of these columnar structures is in the range of 1≦ds≦40, and it also clear that the magnetic crystal grains show particularly excellent soft magnetic properties when the shape ratios of the columnar structures are in the range of $0.3 \leq ds/dl \leq 0.9$ as shown in Example 1. This is considered to be attained in that in-plane magnetic bonding between the magnetic crystal grains to each other having a columnar structure works effectively due to the specific size of the crystal grain inside the film surface. In addition, since the shape ratio of the cylindrical structure is defined, the distribution of bonding between the upper and lower magnetic layers and in-plane magnetic layers is considered to be optimized.

In these examples, Fe and Fe-Co alloy were used as the metallic magnetic material. However, it was confirmed that the same effects can be obtained with magnetic alloys mainly composed of Co, Ni, Co-Ni, Fe-Ni, Fe-Co-Ni and so on.

Example 3

The following examples were performed to examine effects caused by additives present inside the main magnetic layer.

As an example a, a magnetic laminated film was formed by alternately laminating a magnetic layer of 30 nm composed of 89Fe-2Al-9Si (weight %) by means of a magnetron sputtering method with the use of an Fe-Al-Si target, and an intermediate layer of 2 nm composed of $SiO_2$ which was formed by using a $SiO_2$ target. Here, the discharge gas used for the intermediate layer was $Ar+O_2$.

As an example b, a magnetic laminated film was formed by alternately laminating a main magnetic layer of 30 nm composed of 95Fe-2Co-3V which was formed by means of a magnetron sputtering method with the use of a V target disposed on top of an Fe-Co alloy, and an intermediate layer of 2 nm composed of $SiO_2$ which was formed by using a $SiO_2$ target. The discharge gas used for the intermediate layer was $Ar+O_2$.

As an example c, a magnetic thin film was formed by alternately laminating a magnetic layer of 30 nm composed of 92.5Fe-5Si-2.5Ti (weight %) which was formed by means of a magnetron sputtering method with the use of a target comprising a Fe-Si alloy provided with a Ti chip on the top, and an intermediate layer of 2 nm composed of AlN which was formed by using an AlN target. The discharge gas used for the intermediate layer was $Ar+N_2$.

As an example d, a magnetic thin film was formed by alternately laminating a magnetic layer of 30 nm composed of 96Fe-1Al-3Ti (weight %) which was formed by means of a magnetron sputtering method with the use of a target comprising a Fe-Al alloy provided with a Ti chip on the top, and an intermediate layer of 2 nm composed of AlN, which was formed by using an AlN target. The discharge gas used for the intermediate layer was $Ar+N_2$.

As a comparative example, a magnetic thin film was formed by alternately laminating a magnetic layer of 30 nm composed of 96Fe-4Cu, which was formed by means of a magnetron sputtering method with the use of a target comprising Fe provided with a Cu chip on the top, and an intermediate layer of 2 nm composed of $SiO_2$ which was formed by using a $SiO_2$ target. The discharge gas used for the intermediate layer was $Ar+O_2$.

For each example of magnetic thin film, the shape ratio and the resistive magnetic power Hc after annealing at 350° C. and 550° C. are shown in Table 4 below.

TABLE 4

| | | Example | | | | Comparative |
|---|---|---|---|---|---|---|
| | | a | b | c | d | example |
| After annealing at 350° C. | Shape ratio | 0.6 | 0.6 | 0.5 | 0.5 | 0.7 |
| | Hc(Oe) | 0.4 | 0.9 | 0.8 | 1.0 | 1.5 |
| After annealing at 550° C. | Shape ratio | 0.6 | 0.6 | 0.6 | 0.6 | 1.2 |
| | Hc(Oe) | 0.2 | 0.8 | 0.7 | 0.8 | 3.1 |

According to the results shown in Table 4, when the magnetic crystal grains comprising the magnetic layer includes at least one element M having a lower value of oxide formation free energy or nitride formation free energy than Fe inside the grains, and the shape ratio of a preferable magnetic crystal grain is also maintained after the heat treatment. The heat treatment resistant property of soft magnetic properties is improved. This is considered to be attained by mutual dispersion between the magnetic layer and the intermediate layer or grain growth of the magnetic crystal grain being appropriately controlled.

As mentioned above, when the magnetic thin film of these examples includes, for example, a magnetic metal such as Fe, Co, Ni, Fe-Co, Co-Ni, Fe-Ni, and Fe-Co-Ni inside the magnetic layer, or when the above-mentioned magnetic metals include at least one element having a lower value of oxide formation free energy or nitride formation free energy than Fe which is selected, for example, from the group consisting of Al, Si, Ta, Ti, Mg, Zr, Mn, Ca, Cr, B, V, Nb, W, Zn, C, Mo, Ce, Hf, etc., dispersion at the grain boundary of magnetic crystal grains is appropriately prevented. In addition, heat stability of the shape ratio of the magnetic crystal grains can be improved, so that a preferable magnetic thin film can be formed.

Next, the examples a to b shown in Table 4 underwent heat treatment at 750° C. in vacuum, and heat treatment resistant property was evaluated. The results are shown in Table 5.

TABLE 5

| | | Comparative example a | Example b | Comparative example c | Comparative example d |
|---|---|---|---|---|---|
| After anneal at 750° C. | Hc(Oe) | 2.8 | 0.9 | 2.5 | 2.8 |

Structures of the samples a to d in Table 5 were observed by a SEM, and it was found that the layer structures were destroyed in samples a, c, and d. This is considered to be resulting from the fact that the main magnetic layer/intermediate layer in each of the samples a, c, and d comprises $FeAlSi/SiO_2$, FeSiTi/AlN, and FeAlTi/AlN, and that with regard to oxide forming or nitride formation free energy, Si in the intermediate layer is lower than Al in the sample a, and Al is lower than Ti in the samples c and d.

Therefore, it was proven that the magnetic thin films in the invention examples can stablize the manostructure, when at least one element $M_B$ having lower oxide formation free energy or nitride formation free energy than Fe and at least one element $X_B$ selected from the group consisting of C, B, N, and O are included inside the intermediate layer. Furthermore, an element which satisfies the relationship of $$G\ (M_A, X_B) \geq G\ (M_B, X_B)$$

is included inside the main magnetic layer, wherein the compound formation free energy of an element $M_A$ having lower oxide formation free energy or nitride formation free energy than Fe and the above-mentioned element $X_B$ is indicated as G ($M_A$, $X_B$), and the compound formation free energy of the above-mentioned element $M_B$ and the above-mentioned element $X_B$ is indicated as G ($M_B$, $X_B$).

As a next example, a magnetic thin film was formed by alternately laminating a main magnetic layer of 15 nm composed of 88.3Fe-0.7Al-9.5Si-1.5X (weight %) by means of a magnetron sputtering method with the use of a Fe-Al-Si target, and an intermediate layer of 1 nm composed of $SiO_2$ which was formed by using a $SiO_2$ target. In this example, X is one element selected from the group consisting of C, B, O, and N, and the discharge gas used for the intermediate layer was $Ar+O_2$.

As a comparative example, a magnetic thin film was formed by alternately laminating a main magnetic layer of 15 nm composed of 89.7Fe-0.7Al-9.6Si (weight %) and an intermediate layer of 0.5 nm composed of $SiO_2$, which was formed by using a $SiO_2$ target.

As an example, a magnetic thin film was formed by alternately laminating a main magnetic layer of 100 nm composed of 88.3Fe-0.7Al-9.5Si-1.5X (weight %) by means of a magnetron sputtering method with the use of an Fe-Al-Si target, and an intermediate layer of 1 nm composed of $SiO_2$, which was formed by using a $SiO_2$ target. X is one element selected from the group consisting of C, B, O, and N, and the discharge gas used for the intermediate layer was $Ar+O_2$.

As a comparative example, a magnetic thin film was formed by alternately laminating a main magnetic layer of 100 nm composed of 89.7Fe-0.7Al-9.6Si (weight %) and an intermediate layer of 1 nm composed of $SiO_2$ which was formed by using a $SiO_2$ target.

As for each example of magnetic thin film, the shape ratio and the resistive magnetic power Hc after annealing at 550° C. are shown in Table 6 below.

TABLE 6

| | | Example | | | | Comparative |
| | | C | B | N | O | example |
|---|---|---|---|---|---|---|
| Intermediate layer 15 nm | Shape ratio | 0.8 | 0.8 | 0.7 | 0.7 | 1.1 |
| | Hc(Oe) | 0.4 | 0.3 | 0.2 | 0.3 | 0.9 |
| Intermediate layer 100 nm | Shape ratio | 0.5 | 0.6 | 0.6 | 0.6 | 0.2 |
| | Hc(Oe) | 0.3 | 0.3 | 0.3 | 0.3 | 0.8 |

According to the results shown in Table 6, when at least one element selected from the group consisting of C, B, O, and N is included in the main magnetic layer, preferable shape ratios of the columnar grains shown in Example 1 can be obtained, and excellent soft magnetic properties can be also attained. In addition to the examples shown in this embodiment, even if an element having lower oxide or nitride formation free energy than Fe, for example, Al or Si etc. is not included in the main magnetic layer, when at least one element selected from the group consisting of C, B, O, and N is included in the main magnetic layer, the mano-structure of this invention, which shows the same excellent soft magnetic properties, can be easily attained.

Example 4

The following examples were performed to examine the effects of elements contained inside an intermediate layer.

Five types of magnetic thin films were formed by alternately laminating a Fe magnetic layer of 50 nm, which was formed by means of a magnetron sputtering method under the same sputtering conditions as in Example 3, and an intermediate layer of 2 nm having a composition selected from the group consisting of Si, $SiO_2$, $Si_3N_4$, SiC, and Cu. The shape ratio in each of these five types of magnetic thin films was examined immediately after the film formation and after annealing at 500° C.. The shape ratios of the above-mentioned magnetic thin films are shown together with the resistive magnetic power Hc in Table 7 below.

TABLE 7

| | | Example | | | Comparative example | |
|---|---|---|---|---|---|---|
| Type of intermediate layer | | $SiO_2$ | $Si_3N_4$ | SiC | Si | Cu |
| Immediately after film formation | Shape ratio | 0.5 | 0.55 | 0.6 | 0.6 | 0.7 |
| | Hc(Oe) | 0.9 | 1.0 | 1.1 | 1.1 | 1.5 |
| After annealing at 500° C. | Shape ratio | 0.55 | 0.45 | 0.6 | 1.2 | 1.0 |
| | Hc(9e) | 1.1 | 1.3 | 1.2 | 5 | 4.0 |

According to the results shown in Table 7, when at least one element M having lower oxide or nitride formation free energy than Fe and at least one element selected from the group consisting of C, B, O, and N are included inside the intermediate layer, the desired shape of the magnetic crystal grain shown in Example 1 can be attained more easily, and the film is also stable against heat treatment.

As a next example, three types of magnetic thin films were formed by alternately laminating a Fe magnetic layer of 5 nm, which was formed by means of a magnetron sputtering method under the same sputtering conditions as in Example 3, and an intermediate layer of 0.5 nm having a composition selected from the group consisting of FeSiO, FeSiN, and FeSiC. The shape ratio in each of these three types of magnetic thin films was examined after annealing at 500° C. Saturation magnetic flux density of each intermediate layer was about 0.03 to 0.3 tesla.

As a comparative example, three types of magnetic thin films were formed by alternately laminating a Fe magnetic layer of 5 nm and an intermediate layer of 0.5 nm having a composition selected from $SiO_2$ and $Si_3N_4$. The shape ratio in each of these three types of magnetic thin films was examined after annealing at 500° C. The shape ratios of the above-mentioned magnetic thin films are shown together with the resistive magnetic power Hc in Table 8 below.

TABLE 8

| | | Example | | | Comparative example | |
|---|---|---|---|---|---|---|
| Type of intermediate layer | | FeSiO | FeSiN | FeSiC | $SiO_2$ | $Si_3N_4$ |
| After annealing at 500° C. | Shape ratio | 0.6 | 0.6 | 0.7 | 0.4 | 0.3 |
| | Hc(Oe) | 0.9 | 1.0 | 0.9 | 1.5 | 1.3 |

According to the results shown in Table 8, when at least one element having lower oxide or nitride formation free energy than Fe and at least one element selected from the group consisting of C, B, O, and N are included inside the intermediate layer, the shape of the magnetic crystal grain shown in Example 1 can be attained. Furthermore, by a magnetic metal being inserted into the intermediate layer, soft magnetic properties are excellent. This is due to the fact that as the thickness of the intermediate layer becomes comparatively smaller, the intermediate layer containing a metallic magnetic material can attain low interface energy.

Example 5

The following examples were performed to examine how soft magnetic properties are influenced by the composition ratio between a magnetic layer and an intermediate layer near the interface.

As an example, a magnetic thin film was formed by alternately laminating a magnetic layer of 50 nm composed of 85Fe-5.8Al-9.2Si by means of a magnetron sputtering method with the use of an Fe-Al-Si target, and an intermediate layer of 5 nm. Here, five types of magnetic thin films were formed as the intermediate layer by changing a number of Si chips which were placed on top of a $TiO_2$ target. The shape ratio and soft magnetic properties were examined after annealing at 600° C. in each of the magnetic thin films, and the results are shown in Table 9 below. In Table 9, the ratio a/b represents Si concentration near the interface in the magnetic layer/Si concentration near the interface in the intermediate layer. These values were obtained by the EDS composition analysis of 3 nm spot with the TEM after heat treatment at 600° C.

TABLE 9

| After annealing at 600° C. | a/b | 0.2 | 2.0 | 4.5 | 5.0 |
|---|---|---|---|---|---|
| | Shape ratio | 0.4 | 0.4 | 0.3 | 0.2 |
| | Hc(Oe) | 0.2 | 0.3 | 0.3 | 0.8 |

As an example, a magnetic thin film was formed by alternately laminating a magnetic layer of 20 nm composed of 92.5Fe-5Si-2.5Ti by means of a magnetron sputtering method with the use of a Fe-Si target provided with a Ti chip on the top, and an intermediate layer of 5 nm. Here, five types of magnetic thin films were formed as the intermediate layer by changing a number of Ti chips placed on top of an $Al_2O_3$ target. The shape ratio and soft magnetic properties were examined after annealing at 600° C. in each of the magnetic thin films, and the results are shown in Table 10 below. In Table 10, the ratio a/b represents Ti concentration near the interface in the magnetic layer/Ti concentration near interface in the intermediate layer. These values were obtained by EDS composition analysis of 3 nm spot with the TEM after heat treatment at 600° C.

TABLE 10

| After annealing at 600° C. | a/b | 0.2 | 1.5 | 4.3 | 5.4 |
|---|---|---|---|---|---|
| | Shape ratio | 0.5 | 0.6 | 0.6 | 0.2 |
| | Hc(Oe) | 1.2 | 0.9 | 1.2 | 2.1 |

As an example, a magnetic thin film was formed by alternately laminating a magnetic layer of 50 nm composed of 81.8Fe-1.9Al-16.3Si by means of a magnetron sputtering method with the use of an Fe-Al-Si target, and an intermediate layer of 5 nm. Here, four types of magnetic thin films were formed as the intermediate layer by using the same target as that of the magnetic layer and by changing the pressure of $Ar+O_2$ used as the discharge gas. The shape ratio and soft magnetic properties were examined after annealing at 600° C. in each of the magnetic thin films, and the results are shown in Table 11 below. In Table 11, a/b represents Fe concentration near the interface in the magnetic layer/Fe concentration near the interface in the intermediate layer. These values were respectively obtained by EDS composition analysis of 3 nm spot with the TEM after heat treatment at 600° C.

TABLE 11

| After annealing at 600° C. | a/b | 3.0 | 3.5 | 4.5 | 5.0 | 6.0 |
|---|---|---|---|---|---|---|
| | Shape ratio | 0.4 | 0.5 | 0.4 | 0.2 | 0.2 |
| | Hc(Oe) | 0.2 | 0.2 | 0.3 | 0.4 | 1.9 |

According to the results mentioned above, interface stress etc. can be reduced and preferable soft magnetic properties can be obtained, when the magnetic layer and the intermediate layer share at least one element, and that the atom weight % of concentration a of the element inside the intermediate layer near the interface of the magnetic layer and the intermediate layer, and the atom weight % of concentration b of the element inside the magnetic layer are in the range of $0 < a/b \geq 5.0$.

Compositions inside the grains shown in the following tables are compositions obtained in average by EDS which can limit the range to about 3 nm. The tables show compositions at representative points, but the values of compositions inside the grains were successive. Furthermore, the case in which a trace of oxygen of less than 1.5 at. % was detected inside the grains, is not listed here because in this case accurate measurements cannot be obtained.

Example 6

The following examples and comparative examples relate to heat treatment resistant property of magnetic thin films obtained by controlling the composition gradient inside the magnetic crystal grains, and average diameters of the crystal grain at 400° C. and at 700° C. were examined together with the compositions and soft magnetic properties in the central part of the crystal grain and near the surface of the crystal grain (resistive magnetic power: Hc). The results at 400° C. are shown in Table 12, and the results at 700° C. are shown in Table 13.

By means of a magnetron sputtering method, magnetic thin films were formed under the conditions mentioned below by using an Fe-Ti alloy target in an example a, an Fe-Ti-Al alloy target in an example b, and an Fe target provided with a Cu chip on the top in an example c.

(1) Discharge gas pressure: 8 mTorr
(2) Type of discharge gas: $Ar+O_2$
(3) Input electric power: 400 W
(4) Film thickness: 3 μm Furthermore, as a comparative example d, a magnetic thin film was formed by means of a magnetron sputtering method with the use of Fe under the same conditions as mentioned above.

In addition, as comparative examples e and f, magnetic thin films were formed by means of a magnetron sputtering method with the use of Fe as a target in a comparative example e and with the use of an Fe-Al alloy provided with a Ti chip on the top as a target in a comparative example f.

(1) Discharge gas pressure: 8 mTorr
(2) Type of discharge gas: Ar (3) Input electric power: 400 W
(4) Film thickness: 3 μm

TABLE 12

| 400° C. | Diameter of crystal grain nm | Composition of grain in the central part at. % | Composition near surface inside grain at. % | Hc Oe |
|---|---|---|---|---|
| Example a | 16 | 95Fe1Ti4Si | 91FeITi8Si | 0.6 |
| Example b | 17 | 93Fe7Ti | 88Fe12Ti | 1.2 |
| Example c | 25 | 88Fe12Cu | 93Fe7Cu | 1.9 |
| Comparative example d | 20 | Fe | Fe | |
| Comparative example e | 80 | Fe | Fe | 15 |
| Comparative example f | 90 | 97Fe2Ti1Al | 98Fe1.5Ti0.5Al | 4.0 |

TABLE 13

| 700° C. | Diameter of crystal grain nm | Composition of grain in the central part at. % | Composition near surface inside grain at. % | Hc Oe |
|---|---|---|---|---|
| Example a | 21 | 96Fe0.5Ti4.5Si | 90Fe2Ti8Si | 0.8 |
| Example b | 20 | 944Fe6Ti | 86Fe14Ti | 1.4 |
| Example c | 27 | 86Fe14Cu | 95Fe5Cu | 2.5 |
| Comparative example d | 60 | Fe | Fe | 15 |
| Comparative example e | 100 | Fe | 18 Fe | |
| Comparative example f | 100 | 98Fe1Ti1Al | 99Fe0.5Ti0.5Al | 5.0 |

As shown in Tables 12 and 13, a big difference was not observed between the average diameters of crystal grains in the examples a, b and examples c, d after heat treatment at 400° C., and the amount of oxygen contained in the whole film was about 5 at. % in all cases. However, after heat treatment at 700° C., it was confirmed that the crystal grains in examples a, b, and c were minute, while growth of the grains was observed in the comparative examples d, e, and f.

According to the results of the embodiment mentioned above, it is clear that heat treatment resistant property and soft magnetic properties can be improved by forming a composition gradient of at least one non-magnetic element or at least one element having lower oxide or nitride formation free energy than Fe inside the magnetic crystal grain such that the element has higher concentration towards the surface of the grain than inside the grain.

Furthermore, other than the above-mentioned examples, it was confirmed that the same effects could be attained when one element is present such that the composition gradient of the element has a higher concentration towards the surface than inside the grain. This element may comprise, for example, a magnetic metal such as Fe, Co, Ni, Fe-Co, Co-Ni, Fe-Ni, and Fe-Co-Ni, or at least one element either a non-magnetic element or an element having lower oxide formation free energy or nitride formation free energy than Fe inside the above-mentioned magnetic metals, for example, at least one element having lower oxide or nitride formation free energy than Fe inside a magnetic alloy crystal grain containing one element selected from the group consisting of Al, Si, Ta, Ti, Mg, Zr, Mn, Ca, Cr, B, V, Nb, W, Zn, C, Mo, Ce, Hf etc.

In addition, according to other experiments using magnetic thin films containing nitrogen, carbon, boron, etc., it was confirmed that the same effects could be attained when at least one element selected from the group consisting of a non-magnetic element and an element having lower oxide or nitride formation free energy than Fe are present such that the composition gradient of the element has a higher concentration towards the surface than inside the grain.

Example 7

The following examples and comparative examples relate to heat treatment resistant property of magnetic thin films obtained by controlling the composition gradient inside magnetic crystal grains. Average diameters of crystal grains at 400° C. and at 700° C. were examined together with the compositions and soft magnetic properties in the central part of the crystal grain and near the surface of the crystal grain. The results at 400° C. are shown in Table 14, and the results at 700° C. are shown in Table 15 below.

TABLE 14

| 700° C. | Diameter of crystal grain nm | Composition of grain in the central part at. % | Composition near surface inside grain at. % | Hc Oe |
|---|---|---|---|---|
| Example a | 15 | 96Fe0.5Ti4.5Si | 93.5Fe1.5T15Si | 0.4 |
| Example b | 16 | 94Fe2Ti2Al | 93Fe3.5Ti3.5Al | 1.0 |
| Example c | 18 | 88Fe12Cu | 93Fe7Cu | 1.1 |
| Comparative example d | 21 | Fe | Fe | 2.0 |

TABLE 15

| 700° C. | Diameter of crystal grain nm | Composition of grain in the central part at. % | Composition near surface inside grain at. % | Hc Oe |
|---|---|---|---|---|
| Example a | 19 | 97Fe0.5Ti3.5Si | 93Fe2i5Si | 0.4 |
| Example b | 23 | 97Fe2T41A1 | 93Fe3Ti4Al | 1.2 |
| Example c | 23 | 87Fe13Cu | 94Fe6Cu | 2.0 |
| Comparative example d | 42 | Fe | Fe | 9.o |

By means of a magnetron sputtering method, magnetic thin films of 3 μm were formed by alternately laminating a magnetic layer and an intermediate layer under the conditions mentioned below. Here, an Fe-Al alloy provided with a Si chip on the top was used as a target in the magnetic layer of example a; a Fe-Al alloy provided with a Ti chip on the top was used as a target in the magnetic layer of example b; an Fe target provided with a Cu chip on the top was used in the magnetic layer of example c; and an Fe target was used in the magnetic layer of comparative example d. As for the intermediate layer, $SiO_2$ was used as a target in all cases.
(1) Discharge gas pressure: 8 mTorr
(2) Type of discharge gas: $Ar+O_2$
(3) Input electric power: 400 W
(4) Thickness of one layer: 100 nm/magnetic body, 2 nm/intermediate layer As shown in Tables 14 and 15, a big difference was not observed between average diameters of crystal grains in examples a, b, c, and comparative example d after the heat treatment at 400° C., and the oxygen amount contained in the whole-film was about 5 at. % in all cases. However, after heat treatment at 700° C. was conducted, it was confirmed that the crystal grains in the examples did not grow to large grains, while the intermediate layer in comparative example d became solid about 3 nm, which indicates that the magnetic crystal grains grew and penetrated the intermediate layer.

According to the results mentioned above, for the purpose of controlling grain growth caused by heat treatment or interlayer dispersion which destroys the layer structure, it is preferable that the magnetic crystal grains comprising the magnetic thin films include at least one element selected from the group consisting of a non-magnetic material, an element having lower oxide formation free energy than Fe, and an element having lower nitride formation free energy than Fe inside, and that this element has a composition gradient with a higher concentration towards the surface than inside the grain.

Furthermore, other than the above-mentioned examples, it was confirmed that the same effects could be attained when one element is formed such that the composition gradient of the element has a higher concentration towards the surface than inside the grain. This element comprises a magnetic metal such as Fe, Co, Ni, Fe-Co, Co-Ni, Fe-Ni, and Fe-Co-Ni, or at least one element either a non-magnetic element or an element having lower oxide formation free energy or nitride formation free energy than Fe inside the above-mentioned magnetic metals. Examples include at least one element having lower oxide or nitride formation free energy than Fe inside a magnetic alloy crystal grain containing one element selected from the group consisting of Al, Si, Ta, Ti, Mg, Zr, Mn, Ca, Cr, B, V, Nb, W, Zn, C, Mo, Ce, Hf etc.

In addition, according to other experiments, it was confirmed that the same effects could be attained by using a magnetic layer containing nitrogen, carbon,,boron, etc.

Example 8

The following examples were performed to examine additive elements contained in a main magnetic layer and in an intermediate layer of a magnetic thin film of this invention having a composition gradient.

A magnetic thin film having a composition gradient of this invention inside the grain was formed with a main magnetic layer of 30 nm and an intermediate layer of 2 nm. Table 16 shows the results obtained by examining compositions of the intermediate layer and the main magnetic layer and resistive magnetic power after heat treatment at 500° C. and at 700° C.

TABLE 16

| | Main magnetic layer/intermediate layer | Resistive magnetic power (500° C.) Oe | Resistive magnetic power (750° C.) Oe |
|---|---|---|---|
| Example a | FeAlSiN/SiO$_2$ | 0.2 | 0.4 |
| Example b | FeAlSiN/AlN | 0.2 | 0.5 |
| Example c | FeVSiN/SiO$_2$ | 0.4 | 0.7 |
| Example d | FeVSiN/AlN | 0.4 | 0.6 |
| Comparative example e | FeAlSiO/SiO$_2$ | 0.3 | |
| Comparative example f | FeAlSiO/AlN | 0.3 | 1.5 |
| Example g | FeVSiO/SiO$_2$ | 0.5 | 0.7 |
| Comparative example h | FeVSiO/AlN | 0.6 | 3.1 |

According to the results of Table 16, it is clear that a film of the invention having excellent soft magnetic properties after the heat treatment at 750° C. can be attained when the film includes at least one element $M_B$ having a lower oxide formation free energy or nitride formation free energy than Fe and at least one element $X_B$ selected from the group consisting of C, B, N, and O inside the intermediate layer, and when these films also include at least one element $M_A$ having a lower oxide formation free energy or nitride formation free energy than Fe and at least one element $X_A$ selected from the group consisting of C, B, N, and O inside the main magnetic layer, and also when the relationship of $$G(M_A, X_A) \geq G(M_B, X_B)$$

is satisfied, wherein the compound formation free energy of the element $M_A$ and the element $X_A$ is indicated as $G(M_A, X_A)$, and compound formation free energy of the element $M_B$ and the element $X_B$ is indicated as $G(M_B, X_B)$. In the example a, for example, $M_A$ and $X_A$ are Al and N, and $M_B$ and $X_B$ are Si and O.

Furthermore, when heat treatment at 800° C. was conducted on the samples, the soft magnetic properties in example a deteriorated greatly to about 3 Oe. This is considered to be caused by the fact that the rest of the examples satisfies the relationship of $$G(M_B, X_A) \geq G(M_B, X_B) \quad \text{Formula (1)}$$

$$G(M_A, X_B) \geq G(M_B, X_B) \quad \text{Formula (2)}$$

wherein compound formation free energy of the element $M_B$ and the element $X_A$ is indicated as $G(M_B, X_A)$, and compound formation free energy of the element $M_A$ and the element $X_B$ is indicated as $G(M_A, X_B)$, but it is also true that $G(Si, N) \geq G(Si, O)$, since $G(Al, O) \; G(Si, N)$. As a result, the soft magnetic properties deteriorated due to the interface reaction which took place between the elements.

Example 9

The following examples and comparative examples relate to magnetic properties of magnetic thin films obtained by controlling composition gradients inside magnetic crystal grains in the vertical direction and in the in-plane direction of the film surface. Average diameters of crystal grains at 700° C. were examined together with compositions and soft magnetic properties in the central part of the crystal grain and near the surface of the crystal grain. Compositions at 700° C. in the vertical direction and in the in-plane direction of the film surface are shown in Table 17, and the magnetic properties and the average diameters of grains are shown in Table 18 below.

TABLE 17

| 700° C. | Central part of grain at. % | Near inner surface of grain (vertical) at. % | Near inner surface of grain (in-plane) at. % |
|---|---|---|---|
| Example a | 95Fe1Al4Si | 92Fe2Al6Si | 94Fe1.5Al4.5Si |
| Example b | 90Fe1Co9Ti | 81Fe4Co15Ti | 86Fe2Co12Ti |
| Comparative example c | 94Fe2Al4Si | 93Fe2Al5Si | 93Fe2Al5Si |
| Comparative example d | 90Fe1Co9Ti | 85Fe2Co13Ti | 85Fe2Co13Ti |

TABLE 18

| 700° C. | Diameter of crystal grain (vertical) nm | Diameter of crystal grain (in-plane) nm | Hc Oe |
|---|---|---|---|
| Example a | 20 | 25 | 1.4 |
| Example b | 20 | 27 | 0.5 |

TABLE 18-continued

| 700° C. | Diameter of crystal grain (vertical) nm | Diameter of crystal grain (in-plane) nm | Hc Oe |
|---|---|---|---|
| Comparative example c | 25 | 22 | 1.0 |
| Comparative example d | 25 | 23 | 1.6 |

As an example a, a magnetic thin film was formed by means of a magnetron sputtering method under the following sputtering conditions. First, $SiO_2$ was used to form an intermediate layer of 1 nm on the surface of a non-magnetic substrate, and then in terms of at. %, a magnetic layer 1 of 5 nm composed of 90.3Fe-2Al-4.7Si-30 was formed, and a magnetic layer 2 of 10 nm composed of 92.5Fe-0.9Al-3.6Si-30 was formed, and a magnetic layer 1 of 5 nm composed of 90.3Fe-2Al-4.7Si-30 was formed again. By repeating this procedure, a magnetic thin film comprising intermediate layer/magnetic layer 1/magnetic layer 2/magnetic layer 1/intermediate layer/●●/was formed. The magnetic layers were formed using two types of Fe-Al alloy+Si chip targets formed by changing a number of Si chips placed on top of a Fe-Al alloy. The sputtering conditions were as follows:
(1) Discharge gas pressure: 8 mTorr
(2) Type of discharge gas: $Ar+O_2$
(3) Input electric power: 400 W As an example b, a magnetic thin film was formed by means of a 3-target magnetron sputtering method under the same sputtering conditions as in the example a. First,, $SiO_2$ was used to form an intermediate layer of 1 nm on the surface of a non-magnetic substrate, and then in terms of at. %, a magnetic layer 1 of 5 nm composed of 87.3Fe-2Co-7.7Ti-30 was formed, and a magnetic layer 2 of 10 nm composed of 82.5Fe-2Co-12.5Ti-30 was formed, and a magnetic layer 1 of 5 nm composed of 87.3Fe-2Co-7.7Ti-30 was formed again. By repeating this procedure, a magnetic thin film comprising intermediate layer/magnetic layer 1/magnetic layer 2/magnetic layer 1/intermediate layer/●●/ was formed. Here, the magnetic layers were formed using two types of Fe-Co alloy+Ti chip targets formed by changing a number of Ti chips placed on top of a Fe-Co alloy.

As a comparative example c, a magnetic thin film was formed by means of a magnetron sputtering method under the same sputtering conditions as in the example a. First, $SiO_2$ was used to form an intermediate layer of 1 nm on the surface of a non-magnetic substrate, and then a magnetic layer of 20 nm composed of 91.4Fe-1.5Al-4.1Si-30 was formed, so that a magnetic thin film comprising intermediate layer/magnetic layer/intermediate layer/●●/was formed. Here, the magnetic layer was formed using an Fe-Al alloy+Si chip target formed by placing a Si chip on top of an Fe-Al alloy.

As a comparative example d, a magnetic thin film was formed by means of a magnetron sputtering method under the same sputtering conditions as in the comparative example c. First, an intermediate layer of 1 nm was formed on the surface of a non-magnetic substrate, and then a magnetic layer of 20 nm composed of 85Fe-2Co-10Ti-30 was formed, so that a magnetic thin film comprising intermediate layer/magnetic layer/intermediate layer/●●/was formed. Here, the magnetic layer used a Fe-Co alloy+Ti chip target formed by placing a Ti chip on top of a Fe-Co alloy. Furthermore, the intermediate layer used was a $SiO_2$ film formed under the above-mentioned sputtering conditions.

According to the results of the TEM observation shown in Tables 17 and 18, the examples a, b as well as the comparative examples c, d had average diameters of crystal grains which only differed slightly as a whole after heat treatment at 700° C., although the crystal grains were slightly larger in the in-plane direction of the film surface in the examples a and b, whereas the crystal grains were slightly larger in the vertical direction of the film surface and a part of the intermediate layer was broken in the comparative examples c and d. Furthermore, although in the examples the composition ratio was varied to magnetic layer 1/magnetic layer 2/magnetic layer 1, the magnetic layer was integrated as one layer due to the heat treatment. The composition ratio of the elements comprising the entire film was almost the same in example a and in comparative example c, or in example b and in comparative example d. However, examples a and b showed larger composition gradients in the vertical direction of the film surface than the comparative examples and also had better soft magnetic properties. This is considered to be caused by the fact that composition fluctuation is small in the in-plane direction of the film where a mutual exchange effect of magnetic crystal grains can work even more effectively.

According to the above-mentioned results, the magnetic crystal grains comprising the magnetic thin films of these examples can control growth of crystal grains in the in-plane direction of the film and can enhance magnetic bonding of magnetic crystal grains in the in-plane direction of the film, so that it is preferable that the composition gradients are larger in the vertical direction in the in-plane direction of the thin film.

In addition, according to other experiments, it was confirmed that the same effects could be attained by using a magnetic layer containing nitrogen, carbon, boron, etc. Also, the same effects could be attained when the composition gradient inside the grain is larger in the vertical direction than in the in-plane direction of the film in the magnetic thin film.

Example 10

The following examples and comparative examples relate to a method of manufacturing a magnetic thin film in this invention, which has a composition gradient inside a magnetic crystal grain. The examples were evaluated in terms of oxide and nitride formation free energy. Composition values in the vertical direction and in the in-plane direction of the film surface at 700° C. are shown in Table 19, and the magnetic properties and average diameters of grains are shown in Table 20.

TABLE 19

| 700° C. | Central part of grain at. % | Near surface inside grain (vertical) at. % | Near surface inside grain (in-plane) at. % |
|---|---|---|---|
| Example a | 95Fe1Al4Si | 90Fe2Al8Si | 92Fe1.5Al6.5Si |
| Example b | 96Fe4Si | 93Fe7Si | 95Fe5Si |
| Example c | 96Fe1Al3Si | 89Fe2Al9Si | 91.5Fe1.5Al7Si |
| Example d | 98Fe2Si | 92Fe8Si | 93Fe7Si |
| Comparative example e | 94Fe1Al5Si | 94Fe1.5Al4.5Si | 94Fe1.5Al4.5Si |
| Comparative example f | 94Fe6Si | 93.5Fe6.5Si | 93.5Fe6.5Si |

TABLE 20

| 700° C. | Diameter of crystal grain (vertical) nm | Diameter of crystal grain (in-plane) nm | Hc Oe |
|---|---|---|---|
| Example a | 32 | 30 | 1.0 |
| Example b | 32 | 29 | 1.0 |
| Example c | 30 | 28 | 0.6 |
| Example d | 30 | 28 | 0.7 |
| Comparative example e | 35 | 35 | 1.8 |
| Comparative example f | 36 | 41 | 2.2 |

As an example a, a magnetic thin film was formed by means of a magnetron sputtering method under the following sputtering conditions. First, an intermediate layer of 3 nm composed of 35Cu-5Ti-600 was formed on the surface of a non-magnetic substrate, and then a magnetic layer of 30 nm composed of 94.2Fe-1.3Al-4.5Si was formed, so that a magnetic thin film of 3 $\mu$m comprising intermediate layer/magnetic layer/intermediate layer/●●/was formed. A separation layer used a Cu+Ti chip target formed by placing a Ti chip on top of a Cu target, and the magnetic layer used an Fe-Al alloy+Si chip target. The sputtering conditions were as follows:
(1) Discharge gas pressure: 8 mTorr
(2) Type of discharge gas: Ar/magnetic layer Ar+$O_2$/intermediate layer
(3) Input electric power: 400 W As an example b, a magnetic thin film was formed by means of a magnetron sputtering method under the same sputtering conditions as in example a. First, an intermediate layer of 3 nm composed of 35Cu-5Cr-600 was formed on the surface of a non-magnetic substrate, and then a magnetic layer of 30 nm composed of 96Fe-4Si was formed, so that the magnetic thin film of 3 $\mu$m comprising intermediate layer/magnetic layer/intermediate layer/●●/was formed. In example b, the intermediate layer was formed using a Cu+Cr chip target formed by placing a Cr chip on top of a Cu target, and the magnetic layer used an Fe-Si alloy target.

As an example c, a magnetic thin film was formed by means of a magnetron sputtering method under the following sputtering conditions. First, an intermediate layer of 3 nm composed of 33Fe-6Ti-600 was formed on the surface of a non-magnetic substrate, and then a magnetic layer of 30 nm composed of 94.2Fe-1.3Al-4.5Si was formed, so that a magnetic thin film of 3 $\mu$m comprising intermediate layer/magnetic layer/intermediate layer/●●/was formed. Here, a separation layer was formed using an Fe+Ti chip target formed by placing a Ti chip on top of a Fe target, and the magnetic layer used: a Fe-Al alloy+Si chip target. The sputtering conditions were as follows:
(1) Discharge gas pressure: 8 mTorr
(2) Type of discharge gas: Ar/magnetic layer Ar+$O_2$/intermediate layer
(3) Input electric power: 400 W As an example d, a magnetic thin film was formed by means of a magnetron sputtering method under the same sputtering conditions as in the example a. First, an intermediate layer of 3 nm composed of 34Fe-6Cr-600 was formed on the surface of a non-magnetic substrate, and then a magnetic layer of 30 nm composed of 96Fe-4Si was formed, so that a magnetic thin film of 3 $\mu$m comprising intermediate layer/magnetic layer/intermediate layer/●●/was formed. The intermediate layer was formed using an Fe+Cr chip target formed by placing a Cr chip on top of a Fe target, and the magnetic layer was formed using an Fe-Si alloy target.

As a comparative example e, a magnetic thin film was formed by means of a magnetron sputtering method under the same sputtering conditions as in the example a. First, an intermediate layer of 3 nm composed of MgO was formed on the surface of a non-magnetic substrate, and then a magnetic layer of 30 nm composed of 94.2Fe-1.3Al-4.5Si was formed, so that a magnetic thin film of 3 m comprising intermediate layer/magnetic layer/intermediate layer/●●/was formed. The intermediate layer was formed using a MgO target, and the magnetic layer was formed using an Fe-Al alloy+Si chip target.

As a comparative example f, a magnetic thin film was formed by means of a magnetron sputtering method under the same sputtering conditions as in example c. First, an intermediate layer of 3 nm composed of MgO was formed on the surface of a non-magnetic substrate, and then a magnetic layer of 30 nm composed of 96Fe-4Si was formed, so that a magnetic thin film of 3 $\mu$m comprising intermediate layer/magnetic layer/intermediate layer/●●/was formed. The intermediate layer was formed using a MgO target, and the magnetic layer used an Fe-Si alloy target.

According to the results of the TEM observation regarding the average diameter of the grain and the composition shown in Tables 19 and 20, the average diameters of the crystal grains after the heat treatment at 700° C. in examples a to d and in comparative examples e and f were such that the crystal grains in comparative examples e and f were slightly larger in the in-plane direction and in the vertical direction of the film and a part of the intermediate layer was broken. Furthermore, although a composition change inside the grain was observed in the in-plane direction and in the vertical direction of the film in all the examples, the change was small in the comparative examples.

This is considered to be caused by the fact that since Cu, Fe, and Ti, which have higher oxide and nitride formation free energy than Al or Si of the magnetic layer are included inside the intermediate layers in examples a and c, and since Cu, Fe, and Cr, which have higher oxide and nitride formation free energy than Si of the magnetic layer are included inside the intermediate layers in examples b and d, an oxidation-reduction reaction took place near the layer interface due to the heat treatment, so that a composition gradient was present inside the crystal grains without oxygen being dispersed too much inside the magnetic layer. In particular, the composition gradient in the in-plane direction of the film was smaller than the composition gradient in the vertical direction of the film, so that it was considered to be caused in the form of being lead by the gradient in the vertical direction. On the other hand, the comparative examples show that MgO sinters as a lump after the heat treatment due to the surface free energy, which breaks the layer structure. Therefore, composition gradients are not present inside the magnetic crystal grains, and the magnetic crystal grains are bonded inside the film surface.

Furthermore, when examples a, b, c and d are compared, it is clear that examples c and d, containing a metal magnetic element in the intermediate layer, have better magnetic properties. This is considered to be caused by the fact that the magnetic metal element contained in the intermediate layer improves the bonded condition between the magnetic crystal grains.

As a result, when the magnetic thin films of the above-mentioned examples include at least one element having higher oxide or nitride formation free energy in the intermediate layer than at least one element having lower oxide or nitride formation free energy than Fe contained in the magnetic layer, it is possible to configure magnetic thin films having a larger composition gradient in the vertical direction of the film surface than against the film surface by the heat treatment. Moreover, it was confirmed that soft magnetic properties are improved when a magnetic metal element is included in the intermediate layer.

In addition, according to other experiments, it was confirmed that the same effects could be attained by using a magnetic thin film containing oxygen, nitrogen, carbon, boron, etc.

Example 11

The following examples and comparative examples relate to magnetic properties of a magnetic thin film, in which the magnetic layer and the intermediate layer share at least one element having lower oxide or nitride formation free energy than Fe, and this element has a composition gradient successively in the magnetic layer and in the intermediate layer. Average diameters of crystal grains at 600° C. were examined together with compositions and soft magnetic properties in the central part of the crystal grains and near the surface of the crystal grains. Magnetic properties and average diameters of grains at 600° C. are shown in Table 21 below.

TABLE 21

| 600° C. | Diameter of crystal grain (vertical) nm | Diameter of crystal grain (in-plane) nm | Hc Oe |
|---|---|---|---|
| Example a | 15 | 15 | 0.3 |
| Example b | 15 | 15 | 0.4 |
| Example c | 15 | 18 | 0.6 |
| Comparative example d | 15 | 15 | 1.0 |
| Comparative example e | 15 | 18 | 1.3 |

As an example a, a magnetic thin film was formed by means of a magnetron sputtering method under the following sputtering conditions. First, an intermediate layer of 2 nm composed of an oxide of Fe-Al-Si was formed on the surface of a non-magnetic substrate, and then a magnetic layer of 15 nm composed of 91.5Fe-3Al-5.5Si was formed, so that a magnetic thin film of 3 μm comprising intermediate layer/magnetic layer/intermediate layer/●●/was formed. The intermediate layer and the magnetic layer were formed using the same Fe-Al alloy+Si chip target, which was formed by introducing oxygen intermittently. The sputtering conditions were as follows:
(1) Discharge gas pressure: 8 mTorr
(2) Type of discharge gas: Ar/magnetic layer Ar+O$_2$/intermediate layer
(3) Input electric power: 400 W As an example b, a magnetic thin film was formed by means of a magnetron sputtering method under the same sputtering conditions as for example a mentioned above. First, an intermediate layer of 2 nm composed of an oxide of Fe-Si was formed on the surface of a non-magnetic substrate, and then a magnetic layer of 15 nm composed of 91.5Fe-3Al-5.5Si was formed, so that the magnetic thin film of 3 μm comprising intermediate layer/magnetic layer/intermediate layer/●●/was formed. Here, the intermediate layer was formed using an Fe-Si alloy target, and the magnetic layer was formed using an Fe-Al+Si chip target comprising an Fe-Al alloy target provided with a Si chip on the top.

As an example c, a magnetic thin film was formed by means of a magnetron sputtering method under the same sputtering conditions as for example a mentioned above. First, an intermediate layer of 2 nm composed of an oxide of Fe-Ti was formed on the surface of a non-magnetic substrate, and then a magnetic layer of 15 nm composed of 92Fe-2Ti-6Al was formed, so that a magnetic thin film of 3 μm comprising intermediate layer/magnetic layer/intermediate layer/●●/was formed. Here, the intermediate layer was formed using an Fe+Ti chip target comprising a Fe target provided with a Ti chip on the top, and the magnetic layer was formed using an Fe-Al+Ti chip target comprising an Fe-Al alloy target provided with a Ti chip on the top.

As a comparative example d, a magnetic thin film was formed by means of a magnetron sputtering method under the same sputtering conditions as example a mentioned above. First, an intermediate layer of 2 nm composed of an oxide of Fe-Ti was formed, on the surface of a non-magnetic substrate, and then a magnetic layer of 15 nm composed of 91.5Fe-3Al-5.5Si was formed, so that a magnetic thin film of 3 μm comprising intermediate layer/magnetic layer/intermediate layer/●●/was formed. The intermediate layer in example d was formed using an Fe+Ti chip target comprising an Fe target provided with a Ti chip on the top, and the magnetic layer was formed using an Fe-Al alloy+Si chip target.

As a comparative example e, a magnetic thin film was formed by means of a magnetron sputtering method under the same sputtering conditions as mentioned above. First, an intermediate layer of 2 nm composed of an oxide of Fe-Si was formed on the surface of a non-magnetic substrate, and then a magnetic layer of 15 nm composed of 92Fe-2Ti-6Al was formed, so that a magnetic thin film of 3 μm comprising intermediate layer/magnetic layer/intermediate layer/●●/ was formed. In this example, the intermediate layer was formed using an Fe-Si alloy target, and the magnetic layer was formed using an Fe-Al alloy+Ti chip target.

According to the results of average diameters of grains and soft magnetic properties shown in Table 21, the average diameters of crystal grains after the heat treatment at 600° C. were scarcely different in examples a, b, and c and in comparative examples d and e. However, the soft magnetic properties were superior in the examples. As a result of the EDS, a composition gradient was present inside each grain of all the samples, in which an element having lower oxide or nitride formation free energy than Fe increased in the vertical direction and in the in-plane direction of the film surface rather than in the center of the grains. In particular, it was confirmed that the element Al in example a, the element Si in example b, and the element Ti in example c had composition gradients successively between the magnetic layers and the intermediate layers. On the other hand, when the film surfaces in the examples and in the comparative examples were scratched with loaded needles, it was confirmed that the examples were less likely to be damaged and had stronger bonding between the laminated layers. The stable bonding between the laminated layers in these laminated films of the examples has influence on, for example, relaxation of interface stress etc., and this influence is considered to contribute to the improvement of soft magnetic properties.

According to the above-mentioned results, when at least one element having lower oxide or nitride formation free energy than Fe is shared by the magnetic layer and the intermediate layer, and when the above-mentioned element has a composition gradient successively in the magnetic layer and in the intermediate layer, it can be said that the magnetic thin film has stronger bonding strength between laminated layers after the heat treatment, which then improves soft magnetic properties. According to other experiments being conducted, it became also clear that the same effects can be attained with a magnetic thin film containing oxygen, nitrogen, carbon, boron etc.

Example 12

The following examples and comparative examples were performed to examine magnetic properties of magnetic thin films, in which the type of element having a composition gradient was varied, and also to evaluate soft magnetic properties after heat treatment at 600° C. Average diameters of crystal grains and magnetic properties at 600° C. are shown in Table 22 below.

TABLE 22

| 600° C. | Average diameter of crystal grain nm | Average Composition inside grain at. % | Hc Oe |
|---|---|---|---|
| Example a | 20 | 95Fe3Al2Cr | 0.7 |
| Example b | 20 | 95Fe3Al2V | 0.7 |
| Example c | 20 | 94.2Fe3.8Si2Cr | 0.4 |
| Example d | 20 | 94.2Fe3.8SiV | 0.4 |
| Example e | 20 | 95Fe0.8Al4.2Si | 0.4 |
| Example f | 20 | 85Fe4Al11Si | 0.2 |
| Example g | 20 | 82Fe2Al16Si | 0.2 |
| Example h | 20 | 85Fe5Co10Ti | 0.3 |
| Example i | 20 | 95Fe3Al2Ti | 0.7 |
| Example j | 20 | 94.2Fe3.8Si2Ti | 0.4 |
| Comparative example k | 31 | 94Fe3Mo3Nb | 3.3 |
| Comparative example l | 26 | 94Fe3Ta3Nb | 1.5 |
| Comparative example m | 32 | 94Fe3W3Nb | 4.3 |

As examples a to j and comparative examples k to m, magnetic thin films were formed by means of a magnetron sputtering method under the following sputtering conditions. First, an intermediate layer of 1 nm composed of an oxide of a magnetic layer was formed on the surface of a non-magnetic substrate, and then a magnetic layer of 30 nm was formed, so that a magnetic thin film of 3 μm comprising intermediate layer /magnetic layer/intermediate layer/●●/ was formed. Here, the intermediate layer and the magnetic layer used the same target, and they were formed by changing the oxygen atmosphere during sputtering. The sputtering conditions were as follows:

(1) Discharge gas pressure: 8 mTorr
(2) Type of discharge gas: Ar/magnetic layer Ar+O$_2$/ intermediate layer
(3) Input electric power: 400 W The laminated films shown in Table 22 were formed successively by using the same target and have preferable composition gradients of this invention inside the crystal grains. According to the results in the average diameters of grains and the magnetic properties, when the magnetic thin films in these examples contain at least one element selected from the group consisting of Al, Si, Ti, Cr, and V as oxide or nitride formation free energy element having composition gradients, it is possible to attain magnetic thin films with particularly excellent soft magnetic properties. According to other experiments being conducted, it also became clear that the same effects could be attained with magnetic thin films containing oxygen, nitrogen, carbon, boron etc..

Example 13

The following examples and comparative examples were performed to examine the effects of variations in thickness of the main magnetic layer and intermediate layer. Resistive magnetic power after heat treatment at 500° C. are shown in Tables 23 to 26.

TABLE 2

| | Average thickness of intermediate layer at 500° C. (*) nm | FeAlSi/FeAlSiO Hc Oe | FeAlSiN/FeAlSiON Hc Oe |
|---|---|---|---|
| Comparative example | 0.05 | 10 | 15 |
| Example | 0.1 | 0.2 | 0.2 |
| Example | 1 | 0.4 | 0.3 |
| Example | 1.5 | 1.0 | 1.3 |
| Comparative example | 2.0 | 5.0 | 5.0 |

TABLE 24

| | Average thickness of intermediate layer at 500° C. (*) nm | FeAlSi/FeAlSiO Hc Oe | FeAlSiN/FeAlSiON Hc Oe |
|---|---|---|---|
| Comparative example | 0.05 | 3.0 | 1.2 |
| Example | 0.1 | 0.2 | 0.1 |
| Example | 0.3 | 0.1 | |
| Example | 7.5 | 0.8 | 0.5 |
| Comparative example | 10 | 2.0 | 2.5 |

(*) Thickness of main magnetic layer is 15 nm.

TABLE 25

| | Average thickness of intermediate layer at 500° C. (*) nm | FeAlSi/FeAlSiO Hc Oe | FeAlSiN/FeAlSiON Hc Oe |
|---|---|---|---|
| Comparative example | 0.05 | 7.8 | 2.1 |
| Example | 0.1 | 1.1 | 0.7 |
| Example | 1 | 0.4 | 0.5 |
| Example | 10 | 0.2 | 0.3 |
| Comparative example | 15 | 2.4 | 2.7 |

(*) Thickness of main magnetic layer is 70 nm.

TABLE 26

| | Average thickness of intermediate layer at 500° C. (*) nm | FeAlSi/FeAlSiO Hc Oe | FeAlSiN/FeAlSiON Hc Oe |
|---|---|---|---|
| Comparative example | 0.05 | 5.8 | 2.5 |
| Example | 0.1 | 1.2 | 0.8 |
| Example | 1 | 0.6 | 0.5 |
| Example | 10 | 0.9 | 0.8 |
| Comparative example | 15 | 2.5 | 2.1 |

(*) Thickness of main magnetic layer is 100 nm.

As the examples and comparative examples, by means of a magnetron sputtering method, first, magnetic thin films of 3 μm were formed by alternately laminating an intermediate layer composed of an oxide of a magnetic film and a main magnetic film on the surface of a non-magnetic substrate under the following sputtering conditions.

33

(1) Discharge gas pressure: 2 mTorr
(2) Type of discharge gas: Ar or Ar+$N_2$/magnetic layer Ar+$O_2$/intermediate layer
(3) Input electric power: 400 W According to the results of the TEM observation and the EDS analysis shown in Tables 23 to 26, magnetic thin films were formed successively with the use of the same target, and they had preferable composition gradients or preferable shape ratios inside the diameters of crystal grains, or both characteristics.

Based on the results of the above-mentioned examples, it is clear that excellent soft magnetic properties are attained when the thickness of the main magnetic layer is from 3 nm to 100 nm; the thickness of the intermediate layer is from 0.1 nm to 10 nm; and the ratio obtained by dividing the average thickness of the intermediate layer by the thickness of the main magnetic layer is 0.5 and less.

The above-mentioned examples applied the compositions of FeAlSi/FeAlSiO or FeAlSiN/FeAlSiNO for main magnetic layer/intermediate layer. It was also examined by combining various compositions, in which the main magnetic layer was made of magnetic crystal grains which have the shape ratio of this invention and are made of a magnetic metal such as Fe, Co, Ni, Fe-Co, Co-Ni, Fe-Ni, and Fe-Co-Ni, or a magnetic metal containing at least one element in the above-mentioned magnetic metal selected from the group consisting of a non-magnetic material and an element having a lower value of oxide formation free energy or nitride formation free energy than Fe, for example, Al, Si, Ta, Ti, Mg, Zr, Mn, Ca, Cr, B, V, Nb, W, Zn, C, Mo, Ce, Hf, etc., or which are made of magnetc crystal grains having the composition gradient of this invention inside the crystal grains, and in which the intermediate layer was comprised of the magnetic layer containing at least an element having a lower value of oxide formation free energy or nitride formation free energy than Fe, for example, Al, Si, Ta, Ti, Mg, Zr, Mn, Ca, Cr, B, V, Nb, W, Zn, C, Mo, Ce, Hf, etc. As a result, excellent soft magnetic properties were attained within the range of thickness for the main magnetic layer and the intermediate layer examined in these examples.

Example 14

NiFe of 3 μm was formed by a RF magnetron sputtering method, and after heat treatment at 500° C., a resistive magnetic power 0.5 Oe was obtained. As shown in the comparative example in Table 27, NiFe of 200 μm comprising this composition was laminated with $SiO_2$ having various thicknesses to form 15 layers. Similarly, as an example, NiFe of 200 μm was laminated with a multiple intermediate layer to form 15 layers. The multiple intermediate layer was formed by alternately laminating $SiO_2$ of 2 μm and NiFe of 3 nm until the thickness became the thicknesses shown in Table 27. Values of resistive magnetic power at 500° C. are respectively shown in Table 27 below.

TABLE 27

| Thickness of multiple intermediate layer or $SiO_2$ (nm) | Comparative example ($SiO_2$) (Oe) | Example (multiple intermediate layer) (Oe) |
| --- | --- | --- |
| 7 | 0.7 | 0.1 |
| 27 | 0.3 | 0.1 |
| 87 | 0.5 | 0.2 |
| 107 | 0.6 | 0.4 |

According to the results mentioned above, more excellent soft magnetic properties are attained by using a multiple intermediate layer instead of a non-magnetic layer for the intermediate layer. As a result of the TEM observation, it became clear that the magnetic deterioration of $SiO_2$ with 7 nm occurred mainly because of the layer structure being destroyed by the heat treatment at 500° C. On the other hand, when a multiple intermediate layer was used, there are places where the non-magnetic layer of 2 nm does not form a complete layer structure, so that it appears that the intermediate layer is comprised of only one non-magnetic layer and one magnetic layer at some places. However, since a magnetic layer A which is minutely formed to 3 nm expresses unusual magnetic properties, the multiple intermediate layer is considered to show excellent soft magnetic properties. In particular, when a magnetic thin film which has a multiple intermediate layer of this embodiment and possesses excellent soft magnetic properties of 0.1 Oe was used, the magnetic thin film had a shape ratio of magnetic crystal grains having a columnar structure in the main magnetic layer which fulfills the shape ratio of about 0.3 to 0.4 showing excellent soft magnetic properties of this invention.

Next, a thickness DM of a main magnetic layer M using NiFe was determined to be 200 nm, and an average thickness DB per one layer of a separation layer B using $SiO_2$ was determined to be 2.5 nm, and the change in resistive magnetic power after the heat treatment at 500° C. was examined at the time when an average thickness DA per one layer of a magnetic layer A using NiFe was changed. The main magnetic layer was comprised of a total of 15 layers. Here, the main magnetic layer and the multiple layer intermediate layer, which were laminated, were formed such that the magnetic layer A and the separation layer B were placed in the order of A/B/A following the main magnetic layer M, and the main magnetic layer was formed subsequently. By repeating this process, a magnetic thin film having a multiple intermediate layer was formed. Table 28 below shows the thickness and the configuration of the multiple intermediate layer in each case.

TABLE 28

|  | DM (nm) | DI (nm) | DB (nm) | DA (nm) | Configuration of multiple intermediate layer | Resistive magnetic power (Oe) |
| --- | --- | --- | --- | --- | --- | --- |
| Example | 200 | 2.6 | 2.5 | 0.1 | A/B/A | 0.3 |
| Example | 200 | 3.5 | 2.5 | 1 | A/B/A | 0.2 |
| Example | 200 | 5.5 | 2.5 | 3 | A/B/A | 0.1 |
| Example | 200 | 7.5 | 2.5 | 5 | A/B/A | 0.1 |
| Comparative example | 200 | 9.5 | 2.5 | 7 | A/B/A | 1.0 |

According to the above-mentioned results, it is clear that high properties can be produced when the magnetic layer A comprising the multiple intermediate layer is 5 nm or less in the magnetic thin film having a multiple intermediate layer.

Example 15

FeAlSi of 1.8 tesla was formed with 3 μm by means of a RF magnetron sputtering method, and the property of resistive magnetic power 6.9 Oe was obtained after heat treatment at 500° C.

Next, a thickness DM of a main magnetic layer M using this FeAlSi was determined to be 60 nm, and an average thickness DB per one layer of a separation layer B using $SiO_2$ was determined to be 2.5 nm, and a change in resistive magnetic power after the heat treatment at 500° C. was examined when an average thickness DA per one layer of a magnetic layer A using Fe was examined. The main magnetic layer comprised a total of 50 layers. The main magnetic layer and the multiple intermediate layer, which were laminated, were formed such that the magnetic layer A and the separation layer B are present in the order of A/B/A followed by the main magnetic layer M. Subsequently, the main magnetic layer was repeatedly formed to obtain a magnetic thin film having a multiple intermediate layer. Table 29 below shows each thickness and configuration of the multiple intermediate layer.

TABLE 29

|  | DM (nm) | DI (nm) | DB (nm) | DA (nm) | Configuration of multiple intermediate layer | Resistive magnetic power (Oe) |
|---|---|---|---|---|---|---|
| Example | 60 | 5.1 | 2.5 | 0.1 | A/B/A | 0.4 |
| Example | 60 | 6 | 2.5 | 1 | A/B/A | 0.3 |
| Example | 60 | 8 | 2.5 | 3 | A/B/A | 0.1 |
| Example | 60 | 10 | 2.5 | 5 | A/B/A | 0.3 |
| Comparative example | 60 | 12 | 2.5 | 7 | A/B/A | 1.8 |

According to the above-mentioned results, when the magnetic layer A comprising the multiple intermediate layer of the magnetic thin film having the multiple intermediate layer is 5 nm or less, it is clear that remarkably improved properties can be attained.

Thereafter, a thickness DM of a main magnetic layer M using the same FeAlSi was determined to be 60 nm, and the average thickness DB per one layer of a separation layer B using $SiO_2$ was varied, and the change in resistive magnetic power after the heat treatment at 500° C. was examined at the time when an average thickness DA per one layer of a magnetic layer A using Fe was determined to be 2.5 nm. The main magnetic layer was comprised of a total of 15 layers. Here, the main magnetic layer and the multiple intermediate layer, which were laminated, were formed such that the magnetic layer A and the separation layer B were placed in the order of A/B/A following the main magnetic layer M, and the main magnetic layer was formed subsequently. By repeating this process, a magnetic thin film having a multiple intermediate layer was formed. Table 30 below shows each thickness and configuration of the multiple intermediate layer.

TABLE 30

|  | DM (nm) | DI (nm) | DB (nm) | DA (nm) | Configuration of multiple intermediate layer | Resistive magnetic power (Oe) |
|---|---|---|---|---|---|---|
| Example | 60 | 2.7 | 0.1 | 2.5 | A/B/A | 0.5 |
| Example | 60 | 4.5 | 1 | 2.5 | A/B/A | 0.2 |
| Example | 60 | 12.5 | 5 | 2.5 | A/B/A | 0.1 |
| Example | 60 | 14.5 | 6 | 2.5 | A/B/A | 3.4 |

According to the above-mentioned results, it is clear that excellent properties can be produced when the magnetic layer A comprising the multiple intermediate layer is 5 nm or less In the magnetic thin film having the multiple intermediate layer.

Subsequently, a thickness DM of a main magnetic layer M using this FeAlSi was varied, and the average thickness DB per one layer of a separation layer B using $SiO_2$ was determined to be 2.5 nm. The change in resistive magnetic power after the heat treatment at 500° C. was examined when the average thickness DA per one layer of a magnetic layer A using Fe was determined to be 2.5 nm. The main magnetic layer was determined to be 3 μm. Here, the main magnetic layer and the multiple intermediate layer, which were laminated, were formed such that the magnetic layer A and the separation layer B were placed in the order of A/B/A following the main magnetic layer M, and the main magnetic layer was formed subsequently. By repeating this process, a magnetic thin film having a multiple intermediate layer was formed. Table 31 below shows the thickness and the configuration of the multiple intermediate layer in each case.

TABLE 31

|  | DM (nm) | DI (mn) | DB (nm) | DA (nm) | Configuration of multiple intermediate layer | Resistive magnetic power (Oe) |
|---|---|---|---|---|---|---|
| Comparative example | 1 | 7.5 | 2.5 | 2.5 | A/B/A | 9.3 |
| Example | 3 | 7.5 | 2.5 | 2.5 | A/B/A | 0.3 |
| Example | 10 | 7.5 | 2.5 | 2.5 | A/B/A | 0.2 |
| Example | 30 | 7.5 | 2.5 | 2.5 | A/B/A | 0.2 |
| Example | 50 | 7.5 | 2.5 | 2.5 | A/B/A | 0.1 |
| Example | 70 | 7.5 | 2.5 | 2.5 | A/B/A | 0.1 |
| Example | 100 | 7.5 | 2.5 | 2.5 | A/B/A | 0.3 |
| Comparative example | 150 | 7.5 | 2.5 | 2.5 | A/B/A | 1.5 |

According to the above-mentioned results, it is clear that excellent properties can be produced when the main magnetic layer M in the magnetic thin film having the multiple intermediate layer is 3 nm or more and 100 nm or less.

Next, the thickness DM of a main magnetic layer M using the FeAlSi was determined to be 60 nm, and the change in resistive magnetic power after the heat treatment at 500° C. was examined when the average thickness DI of a multiple intermediate layer was changed such that an average thickness DB per one layer of a separation layer B using $SiO_2$ became equal to an average thickness DA per one layer of a magnetic layer A using Fe. The main magnetic layer was comprised of a total of 50 layers. Here, the main magnetic layer and the multiple intermediate layer, which were laminated, were formed such that the magnetic layer A and the separation layer B were placed in the order of A/B/A following the main magnetic layer M, and the main magnetic layer was formed subsequently. By repeating this process, a magnetic thin film having a multiple layer intermediate layer was formed. Table 32 below shows the thickness and the configuration of the multiple intermediate layer in each case.

TABLE 32

|  | DM (nm) | DI (mn) | DB (nm) | DA (nm) | Configuration of multiple intermediate layer | Resistive magnetic power (Oe) |
|---|---|---|---|---|---|---|
| Comparative example | 60 | 0.12 | 0.04 | 0.04 | A/B/A | 3.1 |
| Example | 60 | 0.18 | 0.06 | 0.06 | A/B/A | 0.7 |
| Example | 60 | 0.6 | 0.2 | 0.2 | A/B/A | 0.5 |
| Example | 60 | 1.8 | 0.6 | 0.6 | A/B/A | 0.3 |
| Example | 60 | 6 | 2 | 2 | A/B/A | 0.1 |
| Example | 60 | 12 | 4 | 4 | A/B/A | 0.2 |
| Example | 60 | 15 | 5 | 5 | A/B/A | 0.3 |

Next, a thickness DM of a main magnetic layer M using this FeAlSi was determined to be 60 nm, and a change in resistive magnetic power after the heat treatment at 500° C. was examined when an average thickness DI of a multiple intermediate layer was changed such that an average thickness DB per one layer in a separation layer B using $SiO_2$, becomes equal to an average thickness DA per one layer in a magnetic layer A. The main magnetic layer was comprised of a total of 50 layers. Here, the main magnetic layer and the multiple intermediate layer, which were laminated, were formed such that the magnetic layer A and the separation layer B were placed in the order of A/B/A following the main magnetic layer M, and the main magnetic layer is formed subsequently. By repeating this process, a magnetic thin film having a multiple intermediate layer was formed. Table 33 below shows the thickness and the configuration of the multiple intermediate layer in each case.

TABLE 33

|  | DM (nm) | DI (mn) | DB (nm) | DA (nm) | Configuration of multiple intermediate layer | Resistive magnetic power (Oe) |
|---|---|---|---|---|---|---|
| Example | 60 | 5 | 1 | 1 | A/B/A/B/A | 0.2 |
| Example | 60 | 10 | 2 | 2 | A/B/A/B/A | 0.1 |
| Example | 60 | 15 | 3 | 3 | A/B/A/B/A | 0.2 |
| Comparative example | 60 | 20 | 4 | 4 | A/B/A/B/A | 1.7 |

According to the above-mentioned results of Tables 32 and 33, it is clear that superior properties can be produced when the thickness DI of the multiple intermediate layer in a magnetic thin film having a multiple intermediate layer is more than 0.2 nm and less than 15 nm.

Example 16

By means of a RF magnetron sputtering method, FeAlSi of 1.8 tesla was formed with 3 μm, and the property of resistive magnetic power 5.2 Oe was obtained after heat treatment at 700° C.

The thickness DM of a main magnetic layer M using the FeAlSi was determined to be 70 nm or 7 nm, and the average thickness DB per one layer of a separation layer B using any oxide composition of FeAlSiO in the main magnetic layer was determined to be 2.5 nm or 0.5 nm. The average thickness DA per one layer of a magnetic layer A using Fe, FeSi or FeAlSi which is the same as the main magnetic property was determined to be 2.5 nm or 0.5 nm, and then resistive magnetic power after heat treatment at 700° C. was examined respectively. The FeAlSiO was formed into a film by reactive sputtering in an oxygen atmosphere. The main magnetic layer was laminated to become about 3 μm as a whole. Here, the main magnetic layer and the multiple intermediate layer, which were laminated, were formed such that the magnetic layer A and the separation layer B were placed in the order of A/B/A following the main magnetic layer M, and the main magnetic layer was formed subsequently. By repeating this process, a magnetic thin film having a multiple intermediate layer was formed. Table 34 below shows the thickness and the configuration of the multiple intermediate layer in each case.

TABLE 34

|  | DM (nm) | DI (nm) | DB (nm) | DA (nm) | Configuration of multiple intermediate layer | Resistive magnetic power (Oe) |
|---|---|---|---|---|---|---|
| a | 70 | 7.5 | 2.5 | 2.5 | Cu/Fe/Cu | 3.5 |
| b | 70 | 7.5 | 2.5 | 2.5 | $SiO_2$/Fe/$SiO_2$ | 2.8 |
| c | 70 | 7.5 | 2.5 | 2.5 | $SiO_2$/FeSi/$SiO_2$ | 0.5 |
| d | 70 | 7.5 | 2.5 | 2.5 | Zr/FeAlSi/Zr | 1.4 |
| e | 70 | 7.5 | 2.5 | 2.5 | $SiO_2$/FeAlSi/$SiO_2$ | 0.4 |
| f | 70 | 7.5 | 2.5 | 2.5 | FeAlSiO/FeAlSi/FeAlSiO | 0.2 |
| g | 70 | 7.5 | 2.5 | 2.5 | FeAlSiO/FeAlSiN/FeAlSiO | 0.1 |
| h | 7 | 1.5 | 0.5 | 0.5 | Cu/Fe/Cu | 5.0 |
| i | 7 | 1.5 | 0.5 | 0.5 | $SiO_2$/Fe/$SiO_2$ | 4.8 |
| j | 7 | 1.5 | 0.5 | 0.5 | $SiO_2$/FeSi/$SiO_2$ | 1.0 |
| k | 7 | 1.5 | 0.5 | 0.5 | Zr/FeAlSi/Zr | 1.8 |
| l | 7 | 1.5 | 0.5 | 0.5 | $SiO_2$/FeAlSi/$SiO_2$ | 0.6 |
| m | 7 | 1.5 | 0.5 | 0.5 | FeAlSiO/FeAlSi/FeAlSiO | 0.5 |
| n | 7 | 1.5 | 0.5 | 0.5 | FeAlSiO/FeAlSiN/FeAlSiO | 0.2 |

By comparing b, c, e, and i, j, l in Table 34 respectively, it is clear that soft magnetic properties of a magnetic thin film having a multiple intermediate layer are improved when at least one kind of material having a lower oxide or nitride formation free energy than Fe is contained inside the magnetic layer A. Furthermore, by comparing f, g and m, n in Table 34, it is clear that soft magnetic, properties are improved when N is present in the magnetic layer A. In addition, by comparing a, b and d, e and h, i and k, l in Table 34 respectively, it is clear that soft magnetic properties are improved when at least one kind of material having lower oxide or nitride formation free energy than Fe and oxygen are contained in the magnetic layer B. Moreover, by comparing e, f and l, m, it is clear that soft magnetic properties are improved by a metal magnetic element being included inside the separation layer B.

Other than the experiments mentioned above, it became clear that excellent soft magnetic properties could be obtained when at leat one material having a lower oxide formation free energy or nitride formation free energy than Fe is contained inside the magnetic layer A in the magnetic thin film having a multiple intermediate layer, or when at least one element selected from the group consisting of C, B, O, and N is present in the magnetic layer A, or at least one element having lower oxide formation free energy or nitride formin free energy than Fe is contained and at least one element selected from the group consisting of C, B, O, and N are included inside the separation layer B, or when a metal magnetic element is contained inside the separation-layer B.

Example 17

By means of a RF magnetron sputtering method, FeAlSi of 1.7 tesla was formed with 3 μm, and the property of resistive magnetic power 5.2 Oe was obtained after heat treatment at 700° C.

As a comparative example of a method of manufacturing a magnetic thin film having a multiple intermediate layer, a FeAlSi target was sputtered under an Ar atmosphere to form a film having a thickness DM of a main magnetic layer M using FeAlSi to become 50 nm by means of a RF magnetron sputtering. Next, by sputtering the same FeAlSi target under the atmosphere of Ar and oxygen, the average thickness DB per one layer in a separation layer B of FeAlSiO being formed was determined to be 2.5 nm, and the average thickness DA per one layer in a magnetic layer A using FeAlSi was formed to become 2.5 nm. By again sputtering the FeAlSi target in an atmosphere of Ar and oxygen, the average thickness DB per one layer in the separation layer B of FeAlSiO was formed to become 2.5 nm. By repeating this process, magnetic thin films having a multiple intermediate layer were formed. Then, after they were subjected to a heat treatment at 500° C. and at 700° C., the resistive magnetic power thereof was examined. In this example, the main magnetic layer was laminated to 60 layers, and the main magnetic layer and the multiple intermediate layer, which were laminated, were formed such that the magnetic layer A and the separation layer B were placed in the order of A/B/A following the main magnetic layer M.

As an example of a method of manufacturing a soft magnetic thin film having a multiple intermediate film by means of a RF magnetron sputtering method, a FeAlSi target was sputtered in an argon atmosphere to form a main magnetic layer M having a thickness DM of 50 nm using FeAlSi. Next, the same FeAlSi target was sputtered in an atmosphere of Ar and oxygen to form a non-magnetic intermediate layer of FeAlSiO with an average thickness of 7.5 nm per one layer. By repeating this process, magnetic thin films having a multiple intermediate layer were formed. Then, after they were subjected to a heat treatment at 500° C. and at 700° C., the resistive magnetic power thereof was examined. In this example, the main magnetic layer was laminated to 60 layers.

Immediately after the thin films in the comparative examples and inventiona examples were formed, analyses of spot composition were performed by TEM observation and EDS. As a result, immediately after the films were formed, the intermediate layer in the comparative example comprised a multiple structure, while the whole intermediate layer was in an amorphous condition in the example. However, according to the heat treatment at 500° C., although a large change was not observed in the example, fluctuation of compositions occurred inside the amorphous intermediate layer. In particular, on the interface adjacent to the main magnetic property, Al and Si were highly concentrated, while Fe became rich, and the amount of oxygen decreased near the center of the intermediate layer. In addition, crystal grains, which could be observed as magnetic body, could be confirmed. Thus, the example apparently had approximately the same structure as a hard magnetic film having a multiple intermediate layer, which was formed in the comparative example. Furthermore, this newly formed multiple intermediate layer had a minute laminated structure comprising two to four layers. This change was even more clearly observed at 700° C.

Values of resistive magnetic power are shown respectively for 500° C. and 700° C.

TABLE 35

|  | Resistive magnetic power at 500° C. (Oe) | Resistive magnetic power at 700° C. (Oe) |
| --- | --- | --- |
| Comparative example | 0.2 | 0.4 |
| Example | 0.3 | 0.4 |

According to the results mentioned above, the method of manufacturing a magnetic thin film having a multiple intermediate magnetic layer of this invention can attain approximately the same properties as those obtained by a layer-by-layer formation, and as the frequency of lamination increases, the formation time can be shortened.

Example 18

The following examples were performed to examine cases, in which an intermediate layer comprising magnetic crystal grains having a spherical or an oval shape was used, provided that magnetic crystal grains in a main magnetic layer of these examples had a columnar structure and a preferable shape ratio of this invention, and that the magnetic crystal grains forming the main magnetic layer had a preferable composition gradient from the inside towards the surface of grain.

By means of a RF magnetron sputtering method, an FeAlSi single film of 1.6 tesla was formed, and after heat treatment at 500° C., the property of 3.8 (Oe) was obtained.

The FeAlSi was used as the main magnetic layer, and an oxide of Fe was selected as the intermediate layer. A thickness of the main magnetic layer was determined to be 10 nm, and the thickness of the intermediate layer was fixed to 5 nm. The Fe oxide comprising the intermediate layer had its oxygen concentration inside Fe variably changed by changing oxygen concentration being contained in Ar gas during sputtering, and in this way, four types of magnetic thin films were formed. After each magnetic thin film was subject to heat treatment at 500° C. in vacuum, resistive magnetic power was measured, and the manostructures of the films were observed by TEM and XRD.

The main magnetic layer was comprised of a columnar structure with a shape ratio of 0.3 to 0.8, and Al and Si were highly concentrated in the vertical direction of the film surface and towards the outside of the magnetic crystal grains. Table 36 shows partial pressure of oxygen present in the entire sputtering gas, condition of the manostructure being observed, resistive magnetic power at the time when only the intermediate layer is formed with 3 μm, and resistive magnetic power of a magnetic thin film of 3 μm.

TABLE 36

|  | Partial pressure of oxygen | Minute structure of intermediate layer | Resistive magnetic power of inter mediate layer | Resistive magnetic power of magnetic thin film (Oe) |
| --- | --- | --- | --- | --- |
| Comparative example a | 1 | main magnetic layer and alloying | 10 | 4.5 |
| Example b | 3 | spherical + amorphous | 12 | 0 0.6 |
| Example c | 7 | spherical + amorphous | 13 | 0.5 |
| Comparative example d | 25 | amorphous | 19 | 10 |

As shown in Table 36, excellent soft magnetic properties were attained by not depending on soft magnetic properties of the intermediate layer itself, but by configuring the magnetic thin film to have the structure of these examples.

Example 19

The following examples and comparative examples were performed to examine a suitable range of thickness for a main magnetic layer and an intermediate layer in a magnetic thin film having an intermediate layer comprising spherical or oval magnetic crystal grains. By means of a RF magnetron sputtering method, an FeAlSi single film of 1.6 tesla was formed, and after heat treatment at 500° C., a property of 3.8 (Oe) was obtained.

FeAlSi or FeAlSiN was used as the main magnetic layer, and an oxide of FeAlSi or acid and nitride of FeAlSi were selected as the intermediate layer. FeAlSiO oxide comprising the intermediate layer was formed by controlling partial pressure of oxygen by changing oxygen concentration contained in Ar gas during sputtering, so that the single film comprising the intermediate layer became the manostructure of a spherical or an oval shape. After the heat treatment, the manostructure of the magnetic thin film was observed, and it was confirmed that magnetic crystal grains in the intermediate layer partially were alloyed with the main magnetic layer, but the main magnetic layer had a columnar structure. It was also observed that the intermediate layer had columnar or oval magnetic crystal grains. Resistive magnetic power of magnetic crystal grains after heat treatment at 500° C. is shown in Tables 37 to 39. In. these tables, schematic structures of the magnetic thin films are shown in the order of composition of the main magnetic layer/composition of the intermediate layer.

TABLE 37

| | Average thickness of intermediate layer at 500° C. (*) nm | FeAlSi/FeAlSiO Hc Oe | FeAlSiN/FeAlSiON Hc Oe |
|---|---|---|---|
| Comparative example | 1 | 2.5 | 2.1 |
| Example | 3 | 0.5 | 0.4 |
| Example | 7 | 0.6 | 0.5 |
| Example | 15 | 1.2 | 1.1 |
| Comparative example | 20 | 4.0 | 5.0 |

(*) Thickness of main magnetic layer is 3 nm.

TABLE 38

| | Average thickness of intermediate layer at 500° C. (*) nm | FeAlSi/FeAlSiO Hc Oe | FeAlSiN/FeAlSiON Hc Oe |
|---|---|---|---|
| Comparative example | 1 | 3.5 | 2.4 |
| Example | 3 | 0.4 | 0.2 |
| Example | 7 | 0.3 | 0.2 |
| Example | 15 | 0.5 | 0.4 |
| Comparative example | 20 | 3.5 | 2.0 |

(*) Thickness of main magnetic layer is 7 nm.

TABLE 39

| | Average thickness of intermediate layer at 500° C. (*) nm | FeAlSi/FeAlSiO Hc Oe | FeAlSiN/FeAlSiON Hc Oe |
|---|---|---|---|
| Comparative example | 1 | 3.4 | 2.7 |
| Example | 3 | 0.6 | 0.4 |
| Example | 7 | 0.6 | 0.4 |
| Example | 15 | 0.7 | 0.6 |
| Comparative example | 20 | 4.5 | 3.0 |

(*) Thickness of main magnetic layer is 15 nm.

According to the results mentioned above, it was confirmed that excellent soft magnetic properties could be obtained when the main magnetic layer was from 3 to 15 nm, and the intermediate layer was from 3 to 15 nm in these embodiments.

Example 20

An FeAlSi single film of 1.4 tesla was formed by means of a RF magnetron sputtering method, and after heat treatment at 500° C., a property of 1.8 (Oe) was obtained.

This FeAlSi was used as a main magnetic layer, and materials shown in Table 40 were selected as an intermediate layer. The intermediate layers were all formed by heat treatment at 500° C. in vacuum, and after that, the compositions were selected so that the single film comprising the intermediate layer had a manostructure of a spherical or an oval shape. Values of resistive magnetic power in each intermediate layer were about 1.5 to 4 Oe. Magnetic thin films were formed by means of a RF magnetron sputtering method, and resistive magnetic power after heat treatement at 500° C. in vacuum and saturation magnetic flux density of the monolayer comprising the intermediate layer are shown in Table 40 below. In Table 40, schematic structures of the magnetic thin films were shown in the order of composition of the main magnetic layer/composition of the intermediate layer.

TABLE 40

| | Main magnetic layer/ intermediate layer/ main magnetic layer | Saturation magnetic flux density (tesla) | Resistive magnetic power (Oe) |
|---|---|---|---|
| a | FeAlSi/FeN/FeAlSi | 1.3 | 0.3 |
| d | FeAlSi/FeO/FeAlSi | 1.3 | 0.5 |
| e | FeAlSi/FeAlN/FeAlSi | 1.2 | 0.4 |
| f | FeAlSi/FeAlB/FeAlSi | 0.8 | 0.3 |
| g | FeAlSi/FeAlC/FeAlSi | 0.9 | 0.6 |
| h | FeAlSi/FeAlO/FeAlSi | 1.1 | 0.6 |
| i | FeAlSi/FeSiN/FeAlSi | 1.2 | 0.3 |
| j | FeAlSi/FeSiB/FeAlSi | 1.3 | 0.3 |
| l | FeAlSi/FeSiO/FeAlSi | 1.2 | 0.3 |

As shown in Table 40 above, the magnetic thin films having spherical or oval magnetic crystal grains in the intermediate layer show excellent soft magnetic properties compared with the single film of the main magnetic layer or the single film of the intermediate layer. As shown in these examples, it is preferable that the main magnetic layer has higher saturation magnetic flux density of more than 0.1 tesla than the intermediate layer. Also, it is clear from this table that magnetic crystal grains can achieve the grain diameter with less difficulty when at least one element is included in the intermediate layer which is selected from the group consisting of C, B, N, and O. Furthermore, it is preferable to include an element having lower oxide or nitride formation free energy than Fe in the intermediate layer.

The invention may be embodied in other forms without departing from the spirit or essential characteristics thereof. The embodiments disclosed in this application are to be considered in all respects as illustrative and not as restrictive. The scope of the invention is indicated by the appended claims rather than by the foregoing description, and all changes which come within the meaning and range of equivalency of the claims are intended to be embraced therein.

What is claimed is:

1. A magnetic thin film comprising a main magnetic layer on an intermediate layer on a suitable substrate, wherein the main magnetic layer is comprised of magnetic crystal grains substantially having a columnar structure, the magnetic crystal grains have an average height dl and an average diameter ds forming a shape ratio of $0.3 \leq ds/dl \leq 0.9$, and wherein the intermediate layer has a saturation magnetic flux density of at least 0.1 tesla less than said main magnetic layer.

2. The magnetic thin film as in claim 1, wherein the average diameter ds is $1 \leq ds \leq 40$ nm.

3. The magnetic thin film as in claim 1, wherein at least one material having a lower oxide formation free energy or a lower nitride formation free energy than Fe is present in the main magnetic layer.

4. The magnetic thin film as in claim 3, wherein the material having a lower oxide formation free energy or lower nitride formation free energy than Fe present in the main magnetic layer is at least one element selected from the group consisting of Al, Si, Ti, Cr, and V.

5. The magnetic thin film as in claim 1, wherein at least one element selected from the group consisting of C, B, O, and N is present in the main magnetic layer.

6. The magnetic thin film as in claim 1, wherein the main magnetic layer has an average thickness dA of $3 \leq dA \leq 100$ nm and the intermediate layer has an average thickness dB of $0.1 \leq dB \leq 10$ nm, and $0 < dB/dA \leq 0.5$.

7. The magnetic thin film as in claim 1, wherein the intermediate layer comprises at least one element having lower oxide formation free energy or lower nitride formation free energy than Fe and at least one element selected from the group consisting of C, B, O, and N.

8. The magnetic thin film as in claim 1, wherein the intermediate layer comprises at least one material, which is a nitride or an oxide of an element selected from the group consisting of Fe, Al, Si, Ta, Ti, Mg, Zr, Mn, Ca, Cr, B, V, Nb, W, Zn, C, Mo, Ce, Hf.

9. The magnetic thin film as in claim 1, wherein the intermediate layer comprises a metal magnetic element.

10. The magnetic thin film as in claim 1, wherein the intermediate layer comprises multiple layers, and the multiple layer intermediate layer has a multiple structure formed by alternately laminating at least one layer of a magnetic layer A having an average thickness of less than 5 nm and one layer of a separation layer B having an average thickness of less than 5 nm, and an average thickness DM of the main magnetic layer is greater than an average thickness DI of said multiple intermediate layer.

11. The magnetic thin film as in claim 10, wherein the main magnetic layer has an average thickness DM of more than 3 nm and less than 100 nm, and the multiple layer intermediate layer has an average thickness DI of more than 0.2 nm and less than 15 nm, and said multiple layer intermediate layer comprises a separation layer B having an average thickness of less than 5 nm and a magnetic layer A having an average thickness of less than 5 nm.

12. The magnetic thin film as in claim 10, wherein at least one material having a lower oxide formation free energy or lower nitride formation free energy than Fe is present in the magnetic layer A.

13. The magnetic thin film as in claim 10, wherein at least one element selected from the group consisting of C, B, O, and N is present in the magnetic layer A.

14. The magnetic thin film as in claim 10, wherein at least one material having a lower oxide formation free energy or lower nitride formation free energy than Fe and at least one element selected from the group consisting of C, B, O, and N is present in the separation layer B.

15. The magnetic thin film as in claim 10, wherein a metal magnetic element is present in the separation layer B.

16. The magnetic thin film as in claim 10, wherein the intermediate layer comprises a magnetic layer comprised substantially of spherical or ellipsoidal magnetic crystal grains.

17. The magnetic thin film as in claim 16, wherein the main magnetic layer has an average thickness of 3 to 15 nm, and the intermediate layer has an average thickness of 3 to 15 nm.

18. The magnetic thin film as in claim 1, wherein at least one element $M_B$ having a lower oxide formation free energy or lower nitride formation free energy than Fe and at least one element $X_B$ selected from the group consisting of C, B, O, and N are present in the intermediate layer, with the proviso that when an element $M_A$ having a lower oxide formation free energy or lower nitride formation free energy than Fe is present in the main magnetic layer, an element which satisfies the relationship of $G(M_A, X_B) \geq G(M_B, X_B)$ is also present in the main magnetic layer, wherein $G(M_A, X_B)$ represents compound formation free energy of said element $M_A$ and said element $X_B$ and $G(M_B, X_B)$ represents compound formation free energy of said element $M_B$ and said element $X_B$.

19. The magnetic thin film as in claim 1, wherein at least one element $M_B$ having a lower oxide formation free energy or lower nitride formation free energy than Fe and at least one element $X_B$ selected from the group consisting of C, B, O, and N are present in the intermediate layer, with the proviso that when at least one element $M_A$ having a lower oxide formation free energy or lower nitride formation free energy than Fe and at least one element $X_A$ selected from the group consisting of C, B, O, and N are present in the main magnetic layer, an element which satisfies the relationship of $G(M_A, X_A) \geq G(M_B, X_B)$ is also present in the main magnetic layer, wherein $G(M_A, X_A)$ represents compound formation free energy of said element $M_A$ and said element $X_A$ and $G(M_B, X_B)$ represents compound formation free energy of said element $M_B$ and said element $X_B$.

20. The magnetic thin film as in claim 19, wherein an element which satisfies the relationships of $G(M_B, X_A) \geq G(M_B, X_B)$ and $G(M_A, X_B) \geq G(M_B, X_B)$ is present in the main magnetic layer, wherein $G(M_B, X_A)$ represents compound formation free energy of the element $M_B$ and the element $X_A$ and $G(M_A, X_B)$ represents compound formation free energy of the element $M_A$ and the element $X_B$.

21. The magnetic thin film as in claim 1, wherein the main magnetic layer and the intermediate layer share at least one element, and said element has a substantially successive composition gradient between the main magnetic layer and the intermediate layer.

22. The magnetic thin film as in claim 21, wherein an atomic weight % of concentration a of said shared element inside said main magnetic layer and an atomic weight % of concentration b of said element inside said intermediate layer at an interface of said main magnetic layer and said intermediate layer are $0 < a/b \leq 5.0$.

23. The magnetic thin film as in claim 1, wherein the intermediate layer comprises a carbide of an element selected from the group consisting of Fe, Al, Si, Ta, Ti, Mg, Zr, Mn, Ca, Cr, B, V, Nb, W, Zn, Mo, Ce and Hf.

24. A magnetic thin film comprised of crystal grains in a metal magnetic alloy, wherein at least one element is present in said grains which is selected from the group consisting of a non-magnetic element, an element having a lower oxide formation free energy than Fe, and an element having a lower nitride formation free energy than Fe, and wherein said at least one element in said grains has a composition gradient with higher concentration towards the surface than inside said grains.

25. The magnetic thin film as in claim 24 comprising a main magnetic layer on an intermediate layer on a substrate, wherein the main magnetic layer comprises a magnetic thin film having a composition gradient, and the intermediate layer has saturation magnetic flux density of at least 0.1 tesla less than said main magnetic layer.

26. The magnetic thin film as in claim 24, wherein the composition gradient is greater in the thickness direction of the film than in the surface direction.

27. The magnetic thin film as in claim 25, wherein at least one material having lower oxide formation free energy or lower nitride formation free energy than Fe is present in the main magnetic layer.

28. The magnetic thin film as in claim 27, wherein the material having lower oxide formation free energy or lower nitride formation free energy than Fe present inside the main magnetic layer is at least one element selected from the group consisting of Al, Si, Ti, Cr, and V.

29. The magnetic thin film as in claim 25, wherein at least one element selected from the group consisting of C, B, O, and N is present in the main magnetic layer.

30. The magnetic thin film as in claim 25, comprising a main magnetic layer having an average thickness dA of $3 \leq dA \leq 100$ nm and an intermediate layer having an average thickness dB of $0.1 \leq dB \leq 10$ nm, and it is $0 < dB/dA \leq 0.5$.

31. The magnetic thin film as in claim 25, wherein the intermediate layer comprises at least one element having lower oxide formation free energy or lower nitride formation free energy than Fe and at least one element selected from the group consisting of C, B, O, and N.

32. The magnetic thin film as in claim 25, wherein the intermediate layer comprises at least one material, which is a nitride, an oxide, or a carbide of an element selected from the group consisting of Fe, Al, Si, Ta, Ti, Mg, Zr, Mn, Ca, Cr, B, V, Nb, W, Zn, C, Mo, Ce, Hf.

33. The magnetic thin film as in claim 25, wherein the intermediate layer includes a metal magnetic element.

34. The magnetic thin film as in claim 25, wherein the intermediate layer comprises multiple layers, the multiple intermediate layer has a multiple structure formed by alternately laminating at least one layer of a magnetic layer A having an average thickness of less than 5 nm and one layer of a separation layer B having an average thickness of less than 5 nm, and an average thickness DM of the main magnetic layer is greater than an average thickness DI of said multiple intermediate layer.

35. The magnetic thin film as in claim 25, wherein the the main magnetic layer has an average thickness DM of more than 3 nm and less than 100 nm, and the multiple intermediate layer has an average thickness DI of more than 0.2 nm and less than 15 nm, and said multiple intermediate layer comprises a separation layer B having an average thickness of less than 5 nm and a magnetic layer A having an average thickness of less than 5 nm.

36. The magnetic thin film as in claim 35, wherein at least one material having a lower oxide formation free energy or lower nitride formation free energy than Fe is present in the magnetic layer A.

37. The magnetic thin film as in claim 35, wherein at least one element selected from the group consisting of C, B, O, and N is present in the magnetic layer A.

38. The magnetic thin film as in claim 35, wherein at least one material having lower oxide formation free energy or lower nitride formation free energy than Fe and more than one element selected from the group consisting of C, B, O, and N are present in the separation layer B.

39. The magnetic thin film as in claim 35, wherein a metal magnetic element is present in the separation layer B.

40. The magnetic thin film as in claim 25, wherein the intermediate layer comprises a magnetic layer substantially comprised of spherical or ellipsoidal magnetic crystal grains.

41. The magnetic thin film as in claim 40, wherein the main magnetic layer has an average thickness of 3 to 15 nm, and the intermediate layer has an average thickness of 3 to 15 nm.

42. The magnetic thin film as in claim 25, wherein at least one element $M_B$ having lower oxide formation free energy or lower nitride formation free energy than Fe and at least one element $X_B$ selected from the group consisting of C, B, O, and N are present in the intermediate layer, with the proviso that when an element $M_A$ having a lower oxide formation free energy or lower nitride formation free energy than Fe is present in the main magnetic layer, an element which satisfies the relationship of $G(M_A, X_B) \geq G(M_B, X_B)$ is also present in the main magnetic layer, wherein $G(M_A, X_B)$ represents compound formation free energy of said element $M_A$ and said element $X_B$ and $G(M_B, X_B)$ represents compound formation free energy of said element $M_B$ and said element $X_B$.

43. The magnetic thin film as in claim 25, wherein at least one element $M_B$ having a lower oxide formation free energy or lower nitride formation free energy than Fe and at least one element $X_B$ selected from the group consisting of C, B, O, and N are present in the intermediate layer, with the proviso that when at least one element $M_A$ having a lower oxide formation free energy or lower nitride formation free energy than Fe and at least one element $X_A$ selected from the group consisting of C, B, O, and N are present in the main magnetic layer, an element which satisfies the relationship of $G(M_A, X_A) \geq G(M_B, X_B)$ is also present in the main magnetic layer, wherein $G(M_A, X_A)$ represents compound formation free energy of said element $M_A$ and said element X and $G(M_B, X_B)$ represents compound formation free energy of said element $M_B$ and said element $X_B$.

44. The magnetic thin film as in claim 25, wherein the main magnetic layer and the intermediate layer share at least one element, and an atomic weight % of concentration (a) of said element inside said main magnetic layer and an atomic weight % of concentration (b) of said element inside said intermediate layer at an interface of said main magnetic layer and said intermediate layer are $0 < a/b \leq 5.0$.

* * * * *